United States Patent
Levy et al.

(10) Patent No.: US 6,314,511 B2
(45) Date of Patent: *Nov. 6, 2001

(54) MECHANISM FOR FREEING REGISTERS ON PROCESSORS THAT PERFORM DYNAMIC OUT-OF-ORDER EXECUTION OF INSTRUCTIONS USING RENAMING REGISTERS

(75) Inventors: Henry M. Levy; Susan J. Eggers; Jack Lo, all of Seattle, WA (US); Dean M. Tullsen, San Diego, CA (US)

(73) Assignee: University of Washington, Seattle, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 12 days.

(21) Appl. No.: 09/054,100

(22) Filed: Apr. 2, 1998

Related U.S. Application Data

(60) Provisional application No. 60/041,803, filed on Apr. 3, 1997, and provisional application No. 60/041,802, filed on Apr. 3, 1997.

(51) Int. Cl.[7] ....................................................... G06F 9/38
(52) U.S. Cl. .............................................................. 712/217
(58) Field of Search .................................... 712/217, 225, 712/216, 218, 228, 224, 206, 245

(56) References Cited

U.S. PATENT DOCUMENTS 5,590,352 * 12/1996 Zuraski, Jr et al. .................... 712/23
5,627,985 * 5/1997 Fetterman et al. ................... 712/217

(List continued on next page.)

OTHER PUBLICATIONS

IBM (IBM Technical Disclosure Bulletin) vol. 36, No. 12 pp. 555–557, Dec. 1993.*

(List continued on next page.)

Primary Examiner—Eddie Chan
Assistant Examiner—Gautam R. Patel
(74) Attorney, Agent, or Firm—Ronald M. Anderson

(57) ABSTRACT

A system and a method is described for freeing renaming registers that have been allocated to architectural registers prior to another instruction redefining the architectural register. Renaming registers are used by a processor to dynamically execute instructions out-of-order. The present invention may be employed by any single or multi-threaded processor that executes instructions out-of-order. A mechanism is described for freeing renaming registers that consists of a set of instructions, used by a compiler, to indicate to the processor when it can free the physical (renaming) register that is allocated to a particular architectural register. This mechanism permits the renaming register to be reassigned or reallocated to store another value as soon as the renaming register is no longer needed for allocation to the architectural register. There are at least three ways to enable the processor with an instruction that identifies the renaming register to be freed from allocation: (1) a user may explicitly provide the instruction to the processor that refers to a particular renaming register; (2) an operating system may provide the instruction when a thread is idle that refers to a set of registers associated with the thread; and (3) a compiler may include the instruction with the plurality of instructions presented to the processor. There are at least five embodiments of the instruction provided to the processor for freeing renaming registers allocated to architectural registers: (1) Free Register Bit; (2) Free Register; (3) Free Mask; (4) Free Opcode; and (5) Free Opcode/Mask. The Free Register Bit instruction provides the largest speedup for an out-of-order processor and the Free Register instruction provides the smallest speedup.

16 Claims, 20 Drawing Sheets

U.S. PATENT DOCUMENTS

| | | | |
|---|---|---|---|
| 5,675,759 | * | 10/1997 | Shebanow et al. .................. 712/217 |
| 5,724,565 | * | 3/1998 | Dubey et al. ......................... 712/245 |
| 5,872,949 | * | 2/1999 | Kikuta et al. ........................ 712/216 |
| 5,935,240 | * | 8/1999 | Mennemeier et al. ............... 712/225 |

OTHER PUBLICATIONS

Capitanio, Andrea, Nikil Dutt, and Alexandru Nicolau. "Partitioned Register Files for VLIWs: A Preliminary Analysis of Tradeoffs." IEEE: Sep. 1992. 9 pages.

Farkas, Keith I., Norman P. Jouppi, and Paul Chow. "Register File Design Considerations in Dynamically Scheduled Processors." IEEE. Apr. 1996. 12 pages.

Franklin, Manoj and Gurindar S. Sohi. "Register Traffic Analysis for Streamlining Inter–Operation Communication in Fine–Grain Parallel Processors." IEEE. Sep. 1992. 10 pages.

Janssen, Johan and Henk Corporaal. "Partitioned Register File for TTAs." IEEE: Proceedings of MICRO–28. Jan. 1995. 10 pages.

Kiyohara, Tokuzo, Scott Mahlke, William Chen, Roger Bringmann, Richard Hank, Sadun Anik, and Wen–mei Hwu. "Register Connection: A New Approach to Adding Registers into Instruction Set Architectures." IEEE. May 1993. 10 pages.

Llosa, Josep, Mateo Valero, and Eduard Ayguade. "Non–Consistent Dual Register Files to Reduce Register Pressure." IEEE. Feb. 1995. 10 pages.

Lozano C., Luis A., and Guang R. Gao. "Exploiting Short–Lived Variables in Superscalar Processors." IEEE: Proceedings of MICRO–28. Jan. 1995. 11 pages.

Nuth, Peter R. and William J. Dally. "The Named–State Register File: Implementation and Performance." IEEE. Feb. 1995. 10 pages.

Pleszken, A.R., J.R. Goodman, W–C. Hsu, R.T. Joersz, G. Bier, P. Woest, and P.B. Schechter. "WISQ: A Restartable Architecture Using Queues." Association for Computer Machinery. 1987. 10 pages.

Sprangle, Eric and Yale Patt. "Facilitating Superscalar Processing via a Combined Static/Dynamic Register Renaming Scheme." Association of Computer Machinery. Mar. 1994. 5 pages.

Tremblay, Marc, Bill Joy, and Ken Shin. "A Three Dimensional Register File for Superscalar Processors." IEEE. May 1995. 11 pages.

Waldspurger, Carl A. "Register Relocation: Flexible Contexts for Multithreading." IEEE. May 1993. 11 pages.

* cited by examiner

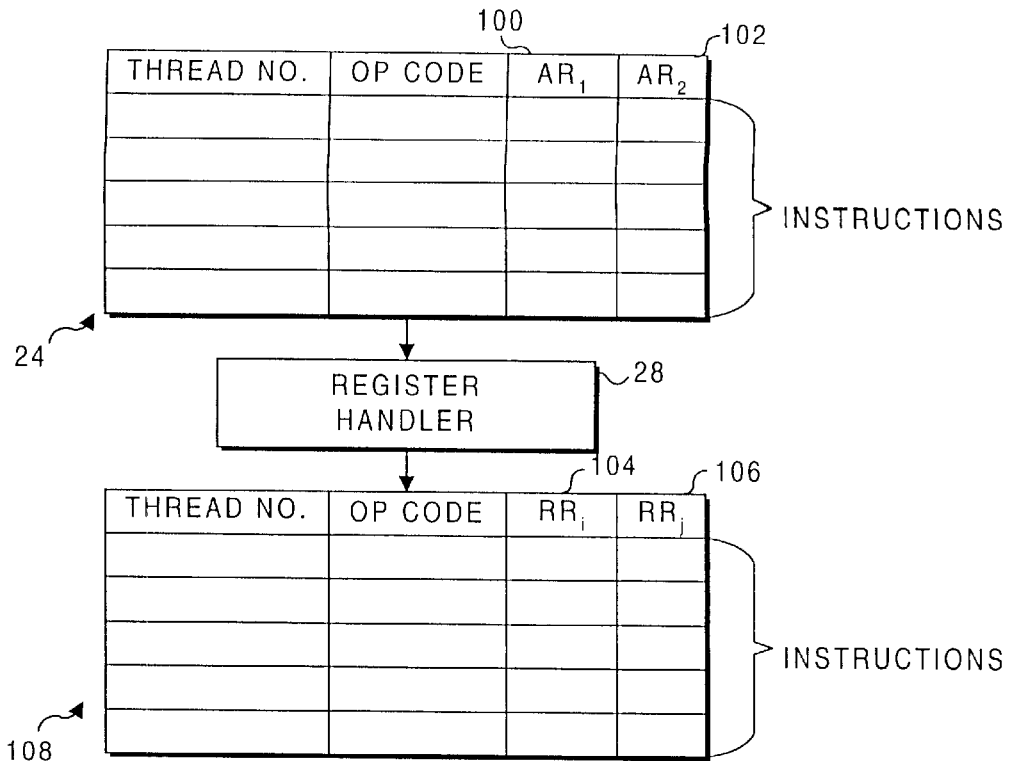

```
ldl    r20, addr1frl       r22
ldl    r21, addr2 (r23)
addl   r20, r21, r12
addl   r21, ox1, r21
       ...
stl    r12, addr3 (r21)
ldl    r20, addr4 (r29)
lda    r29, 0x1000 (r31); MASK FOR REG 12
ldah   r29, 0x20f0 (r12); MASK FOR REGS 20, 21, 22, 23, 29
fml    r29              ; FREE INT REGISTERS IDENTIFIED BY MASK
```
*FIG. 11C*
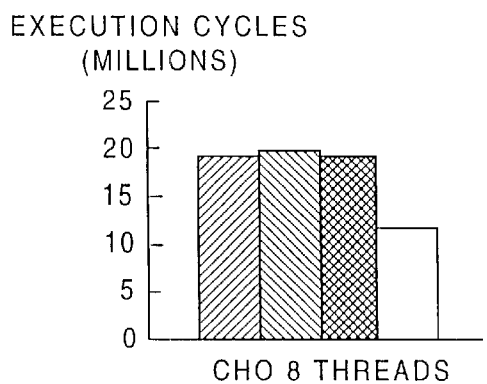
*FIG. 12A*
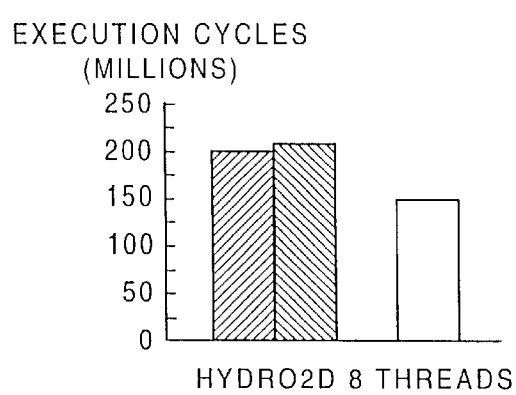
*FIG. 12B*
FSR8
FSR8 FREE REGISTER
FSR8 FREE MASK
FSR8 FREE REGISTER BIT
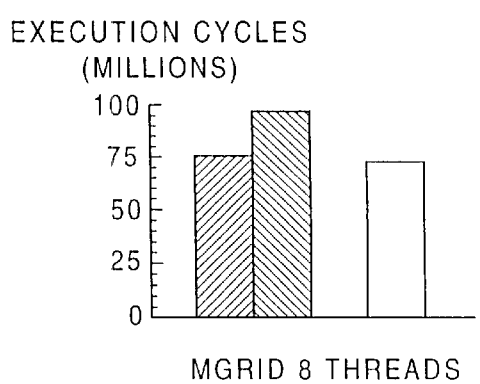
*FIG. 12C*
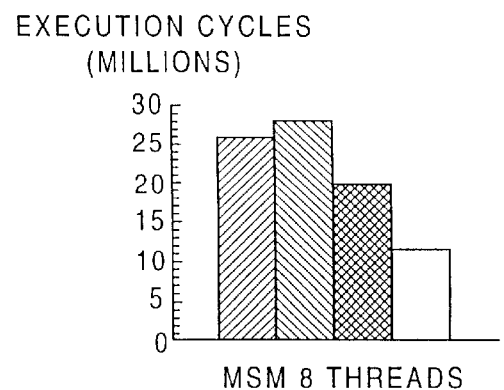
*FIG. 12D*

| | INTEGER | |
|---|---|---|
| OPCODE | 1ST OPERAND | 2ND OPERAND |
| ADDL | X | |
| SUBL | X | |
| MULL | X | |
| STL | | X |
| BEQ | X | |
| LDA | X | |
| LDL | X | |

*FIG. 22A*

| | FLOATING POINT | |
|---|---|---|
| OPCODE | 1ST OPERAND | 2ND OPERAND |
| ADDT | X | |
| SUBT | X | |
| MULT | X | |
| MULT | | X |
| STT | X | |
| STT | X | X |
| FCMOV | X | |
| FCMOV | X | X |

*FIG. 22B*

MECHANISM FOR FREEING REGISTERS ON PROCESSORS THAT PERFORM DYNAMIC OUT-OF-ORDER EXECUTION OF INSTRUCTIONS USING RENAMING REGISTERS

RELATED APPLICATIONS

This application is a continuation-in-part of previously filed U.S. Provisional Patent Applications, U.S. Ser. Nos. 60/041,803, and 60/041,802, both filed on Apr. 3, 1997, the benefit of the filing dates of which is hereby claimed under 35 U.S.C. §119(e).

FIELD OF THE INVENTION

The invention relates to high-performance processors that employ dynamically-scheduled (i.e., hardware-scheduled) out-of-order execution, and more specifically to enabling software for use on such processors to indicate to hardware when a physical register may be reused for another purpose.

BACKGROUND OF THE INVENTION

Modern processors use various techniques to improve their performance. One crucial technique is dynamic instruction scheduling, in which processor hardware can execute instructions out of order, i.e., in an order different than that specified by the programmer or compiler. The hardware can allow out-of-order execution as long as it ensures that the results of the computation are identical to the specified in-order execution. To enable this technique to achieve performance improvement, some hardware implementations provide a set of physical registers, called "renaming registers", which are in addition to the "architectural registers" visible to the programmer.

The renaming registers permit more parallelism, because they allow the hardware to allocate a new renaming register to represent an architectural register when the processor detects the start of a new definition of that architectural register; i.e., when hardware detects a new load into a register. By using a new renaming register to represent this redefinition of the architectural register, a new stream of execution can begin in parallel with the use of the original register.

A physical renaming register backing an architectural register can be "freed" (i.e., disassociated with that architectural register and made available for reallocation to another architectural register) when all instructions that read the old value in the architectural register (which is stored in that physical register) have completed. Hardware detection of these conditions is by its nature overly conservative, that is, the hardware typically maintains the association between a physical renaming register and an architectural register for a longer period than required. Thus, dynamic out-of-order execution techniques are expected to cause a substantial increase in the number of physical registers needed by a processor.

Large register files are a concern for both multithreaded architectures and processors with register windows, as evidenced by the following prior art references. In a paper entitled "Register Relocation: Flexible Contexts for Multithreading," 20th Annual International Symposium on Computer Architecture, pages 120–129, May 1993, C. A. Waldspurger and W. E. Weihi proposed compiler and runtime support for managing multiple register sets in the register file. The compiler tries to identify an optimum number of registers for each thread, and generates code using that number of registers. The runtime system then tries to dynamically pack the register sets from all active, threads into the register file. Also, in a paper entitled, "The Named-State Register File: Implementation and Performance," 1st Annual International Symposium on High-Performance Computer Architecture, January 1995, P. R. Nuth and W. J. Dally proposed the named state register file as a cache for register values. The full register name space is backed by memory, but active registers are dynamically mapped to a small, fast set of registers. This design exploits both the small number of simultaneously active registers and the locality characteristics of register values. For its SPARC™ processor with register windows, Sun Corporation designed 3-D register files to reduce the required chip area, as described by M. Tremblay, B. Joy, and K. Shin in "A Three Dimensional Register File for Superscalar Processors," Hawaii International Conference on System Sciences, pages 191–201, January 1995. Because only one register window can be active at any time, the density of the register file can be increased by overlaying multiple register cells so that they share wires.

Several papers have investigated register lifetimes and other register issues. For example, in "Register File Design Considerations in Dynamically Scheduled Processors," 2nd Annual International Symposium on High-Performance Computer Architecture, January 1996, K. I. Farkas, N. P. Jouppi, and P. Chow compared the register file requirements for precise and imprecise interrupts and their effects on the number of registers needed to support parallelism in an out-of-order machine. They also characterized the lifetime of register values, by identifying the number of live register values present in various stages of the renaming process, and investigated cycle time trade-offs for multi-ported register files.

In "Register Traffic Analysis for Streamlining Inter-Operation Communication in Fine-Grained Parallel Processors," 25th International Symposium on Microarchitecture, pages 236–245, December 1992, M. Franklin and G. Sohi, and in "Exploiting Short-Lived Variables in Superscalar Processors," 28th International Symposium on Microarchitecture, pages 292–302, December 1995, C. L. Lozano and G. Gao noted that register values have short lifetimes, and often do not need to be committed to the register file. Both papers proposed compiler support to identify last uses and architectural mechanisms to allow the hardware to ignore writes to reduce register file traffic and the number of write ports. Franklin and Sohi also discussed the merits of a distributed register file in the context of a multiscalar architecture.

E. Sprangle and Y. Patt, in "Facilitating Superscalar Processing via a Combined Static/Dynamic Register Renaming Scheme," 27th International Symposium on Microarchitecture, pages 143–147, December 1994, proposed a statically-defined tag ISA that exposes register renaming to the compiler and relies on basic blocks as the atomic units of work. The register file is split into two, with the smaller file being used for storing basic block effects, and the larger for handling values that are live across basic block boundaries. In "A Restartable Architecture Using Queues," 14th Annual International Symposium on Computer Architecture, pages 290–299, June 1987, A. R. Pleszkun et al. expose the reorder buffer to the compiler, so that it can generate better code schedules and provide speculative execution.

J. Janssen and H. Corporaal, in "Partitioned Register Files for TTAs," 28th International Symposium on Microarchitecture, pages 303–312, December 1995, A.

Capitanio et al. in "Partitioned Register Files for VLIWs," 25th *International Symposium on Microarchitecture*, pages 292–300, December 1992, and J. Llosa et al., in "Non-Consistent Dual Register Files to Reduce Register Pressure," 1st *Annual International Symposium on High-Performance Computer Architecture*, pages 22–31, January 1995 investigated techniques for handing large register files, including partitioning, limited connectivity, and replication. Kiyohara et al., in "Register Connections: A New Approach to Adding Registers into Instruction Set Architecture," 20th *Annual International Symposium on Computer Architecture*, pages 247–256, May 1993, proposed a technique for handling larger register files by adding new opcodes to address the extended register file.

Based upon the preceding prior art references, it will be apparent that a more flexible approach is needed for sharing physical registers among out-of-order instructions in such a way as to reduce the total register requirement for a processor. The approach used should improve the performance of a given number of registers, reduce the number of registers required to support a given number of instructions with a given level of performance, and simplify the organization of the processor. Currently, the prior art does not disclose or suggest such an approach.

SUMMARY OF THE INVENTION

In accord with the present invention, a method is defined for freeing a renaming register, the renaming register being allocated to an architectural register by a processor for the out-of-order execution of at least one of a plurality of instructions. The method includes the step of including an indicator with the plurality of instructions. The indicator indicates that the renaming register is to be freed from allocation to the architectural register. Also, the indicator is employed to identify the renaming register to the processor. The processor frees the identified renaming register from allocation to the architectural register, so that the renaming register is available to the processor for the execution of another instruction.

In a first preferred embodiment, the indicator is a bit included with an instruction that defines the architectural register. The bit indicates that the renaming register allocated to the architectural register will be freed when the instruction is completed by the processor.

In another preferred embodiment, the indicator is another instruction that indicates that the renaming register allocated to a particular architectural register is to be freed by the processor.

In still another preferred embodiment, the indicator is a mask that includes a plurality of bits that correspond to a plurality of architectural registers. Each bit is employed to indicate that the renaming register allocated to the architectural register is to be freed by the processor. The mask may be included with another instruction that indicates that at least one of the plurality of renaming registers allocated to the plurality of architectural registers is to be freed by the processor. In yet another preferred embodiment, the mask is included with the instruction. In this way, at least one of the plurality of renaming registers allocated to the plurality of architectural registers will be freed by the processor upon completion of the instruction.

In another preferred embodiment, the indicator is an opcode that is included with the instruction. The instruction defines the architectural register and the opcode indicates that the renaming register allocated to the architectural register is to be freed by the processor when the execution of the instruction is completed.

There are at least three ways to provide the indicator to the processor. In one preferred embodiment, the indicator is provided to the processor by a compiler. The compiler performs the step of determining when the architectural register value will no longer be needed. The compiler employs the determination to produce the indicator. In yet another preferred embodiment, the user explicitly provides the indicator to the processor. The user determines when the renaming register allocated to the architectural register is to be freed by the processor. In another preferred embodiment, the indicator is provided by an operating system to the processor. The operating system determines when the execution of an instruction is idle. Further, the operating system indicates to the processor to free the renaming register allocated to the architectural register that is defined by the idle instruction.

The processor employs the freed renaming registers for the execution of the other instructions. The processor reallocates the freed renaming registers to the architectural registers defined by the other instructions. One embodiment of the present invention includes a storage medium, e.g., floppy disk, that has processor-executable instructions for performing the steps discussed above.

A further aspect of the present invention is directed to a system that frees renaming registers allocated to architectural registers. The system includes a processor that is coupled to the renaming registers and the architectural registers. The elements of this system are generally consistent in function with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 9 is a block diagram showing how the register handler maps architectural references in the instructions to renaming registers;

FIG. 10 is an example showing pseudo code to illustrate the register renaming process for architectural register r20;

FIGS. 11A–11C are code fragments illustrating the base or original code, the free register instructions (fr1), and the free mask instructions (fm1) necessary to free the same register;

FIG. 12A is a graph illustrating the execution cycles performed during execution of the Cho benchmark for the FSR8 configuration when implementing no register freeing mechanism, and when implementing the free register, free mask, and free register bit register freeing mechanisms;

FIG. 12B is a graph illustrating the execution cycles performed during execution of the Hydro2D benchmark for the FSR8 configuration when implementing no register freeing mechanism, and when implementing the free register, and free register bit register freeing mechanisms;

FIG. 12C is a graph illustrating the execution cycles performed during execution of the Mgrid benchmark for the FSR8 configuration when implementing no register freeing mechanism, and when implementing the free register, and free register bit register freeing mechanisms;

FIG. 12D is a graph illustrating the execution cycles performed during execution of the Mxm benchmark for the FSR8 configuration when implementing no register freeing mechanism, and when implementing the free register, free mask, and free register bit register freeing mechanisms;

FIG. 22A illustrates a table 500 for Free Opcode instructions that use integer values;

FIG. 22B shows a table 522 for Free Opcode instructions that employ floating point values;

DESCRIPTION OF THE PREFERRED EMBODIMENT

Figures 1, 2:
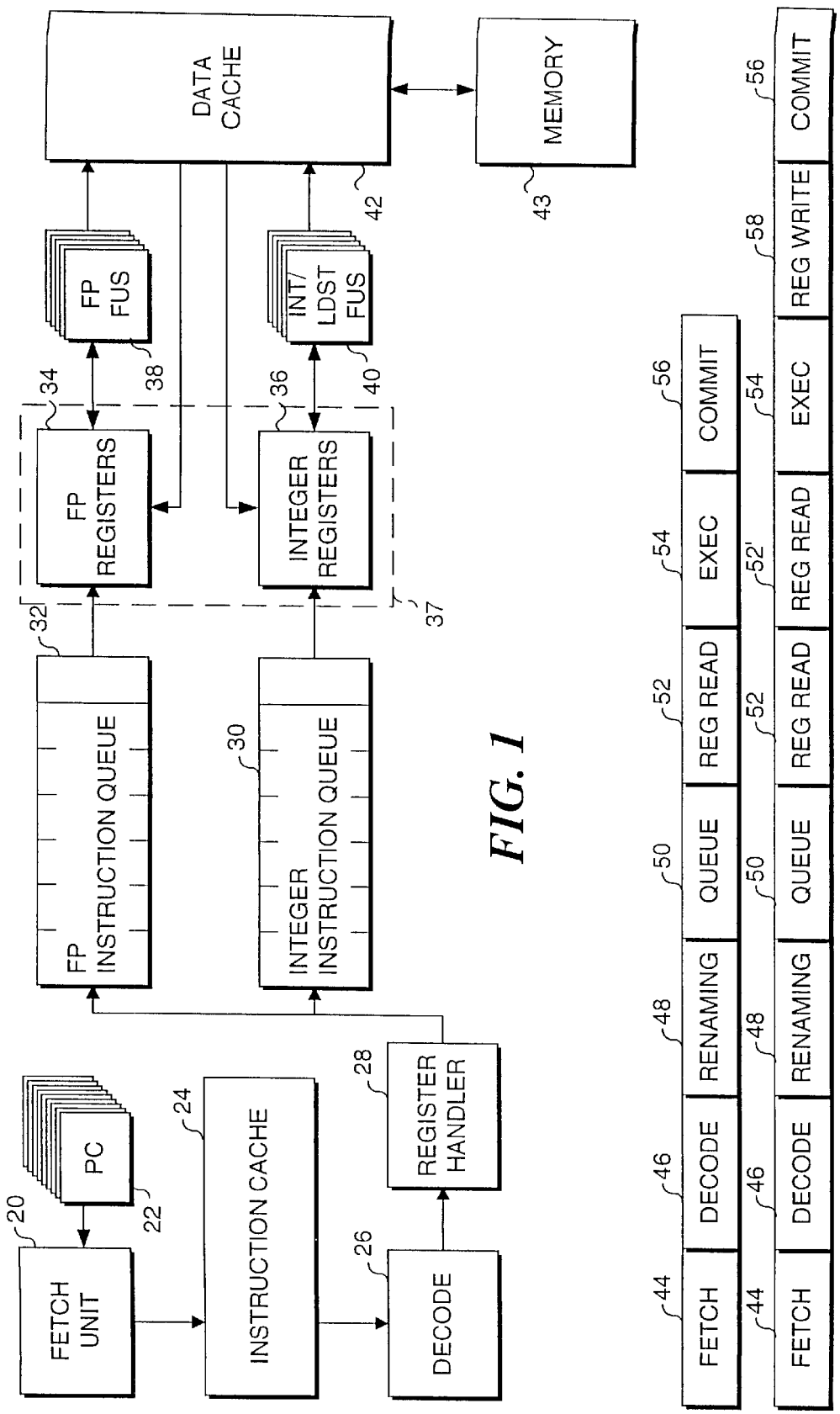
FIG. 1 is a schematic block diagram illustrating the functional organization of the simultaneous multithreaded (SMT) processor for which the present invention is applicable.
FIG. 2 are schematic block diagrams comparing a pipeline for a Conventional superscalar processor (top row of blocks) and a modified pipeline for The SMT processor (bottom row of blocks)

In a processor with dynamic out-of-order instruction processing capability, a physical renaming register is allocated by the processor to represent an architectural register (one named by the instruction), whenever the processor detects a new definition of an architectural register. A new register definition is caused by an operation that writes to a register, thereby modifying the register's contents. The physical register is bound to that architectural register, and any subsequent instructions that read that architectural register are assigned to read from the physical renaming register. The physical register remains bound to the architectural register until the processor detects that the value contained in that register is no longer needed. As noted above, hardware detection of this condition must necessarily be conservative and forces the hardware to wait longer than strictly necessary to free a register. The hardware cannot free the physical register assigned to the architectural register until the processor detects a new definition of the architectural register—i.e., a new write that changes its contents—and this new write completes.

The present invention is a mechanism by which software (either compiler-produced or programmer-produced) can indicate to the processor that a renaming register can be freed and made available for reallocation. The software indicates this through an architectural mechanism, of which the preferred embodiments are discussed below.

A first preferred embodiment employs a processor instruction that specifies one or more registers to free. The operand specifier field of the instruction could be encoded in several possible ways. In the simplest embodiment, the operand specifier field specifies a single register. Or, the operand specifier field can specify multiple registers. For example, in a processor with 32-bit instructions, in which the operation codes are seven bits, and in which there are 32 architectural registers, there are 25 bits remaining for operand specifiers. It is possible to encode up to five five-bit register specifiers in those 25 bits, identifying up to five registers to be freed. Another alternative is for the register free instruction to specify, either directly in the operand specifier or indirectly (the operand specifier indicates a register operand), a mask operand that indicates which registers to free. For example, on a processor with 32 architectural registers, a 32-bit mask could be used, where a one in bit one of the mask indicates that register number one should be freed.

A second preferred embodiment employs bits in any instruction using registers to indicate that one or more of the registers specified by the instruction should be freed following their use by the instruction. For example, consider an Add instruction that specifies that two registers, RegSource1 and RegSource2, be added together, with their sum stored in RegDestination1. The encoding for this instruction could include one or more bits to indicate that the physical renaming registers backing RegSource1 RegSource2, or both, could be freed by the processor following their use to perform the arithmetic. Such bits could be part of the opcode field, part of the register specifier fields, or in any other part of the instruction encoding. It should be noted that the two preferred embodiments are not mutually exclusive, and can be used together in some form within the same architecture.

Introduction

Advanced microprocessors, such as the MIPS R10000™, Digital Equipment Corporation's Alpha 21264™, PowerPC 604™, Intel Corporation's Pentium Pro™, and Hewlett Packard Corporation's PA-RISC 800™, use dynamic, out-of-order instruction execution to boost program performance. Such dynamic scheduling is enabled by a large renaming register file, which, along with dynamic renaming of architectural to renaming registers, increases instruction-level parallelism. For example, the six-issue per cycle Alpha 21264™ has 160 renaming registers (80 integer/80 floating point); the MIPS R10000 has 128 renaming registers (64 integer/64 floating point). While large increases in register file size can improve performance, they also pose a technical challenge due to a potential increase in register access time. The addition of latency-tolerating techniques, such as fine-grained multithreading or simultaneous multithreading, further exacerbates the problem by requiring multiple (per-thread) register sets, in addition to renaming registers.

Simultaneous multithreading (SMT) combines modern superscalar technology and multithreading to issue and execute instructions from multiple threads on every cycle, thereby exploiting both instruction-level and thread-level parallelism. By dynamically sharing processor resources among threads, SMT achieves higher instruction throughputs on both multiprogramming and parallel workloads than competing processor technologies, such as traditional fine-grain multithreading and single-chip shared memory multiprocessors.

With respect to its register requirements, SMT presents an interesting design point. On the one hand, it requires a large number of physical registers; e.g., the simulation of an eight-wide, eight-thread out-of-order SMT processor requires 32 registers for each context, plus 100 renaming registers, for a total of 356 registers. On the other hand, SMT presents a unique opportunity to configure and use the renaming registers creatively, both to maximize register utilization and further increase instruction throughput, and to reduce implementation costs by decreasing either the size of the register file, the number of register ports, or both. This opportunity emerges from SMT's ability to share registers across contexts, just as it shares other processor resources.

Although SMT is the motivating architecture and the test bed employed herein, it is not the only architecture that could benefit from the architectural and compiler techniques disclosed below. Traditional multithreaded processors, processors with register windows, and dynamically-scheduled processors with register renaming should also benefit, each in their own way.

The following specification discloses two approaches for improving register file performance (or alternatively, reducing register-file size) on out-of-order processors that require large register files. First, four alternatives are presented for organizing architectural and renaming registers on a multi-threaded architecture. Test results indicate that flexible register file organizations, in which registers can be shared among threads, provide performance gains when compared to dedicated per-thread register designs. In addition, the flexibility permits the total register file size to be reduced without sacrificing performance. These test results also show that for some parallel applications, inter-thread register sharing is more important to performance than increased thread-level parallelism.

Even with the most flexible register file designs, instruction fetching may still stall, because all physical registers are in use. The problem may not be due to an insufficient register file size, but rather, to poor register management. The second approach to improved register file performance used in the present invention is an architectural technique that permits the compiler to assist the processor in managing the renaming registers. Measurements demonstrate that hardware renaming is overly conservative in register reuse. The compiler, however, can precisely determine the live ranges of register contents, pinpointing the times when reuse can occur. Furthermore, measurements show that with the most effective scheme in this invention, performance on smaller register files can be improved by 64% to match that of larger register files. Furthermore, it should be noted that this technique can be used to improve performance on any out-of-order processor.

Short Description of SMT

The SMT design model employed in the following evaluations is an eight-wide, out-of-order processor with hardware contexts for eight threads as shown in FIG. 1. This model includes a fetch unit 20, which fetches instructions from an instruction cache 24, for each of a plurality of threads 22 being executed by the processor. Every cycle, the fetch unit fetches four instructions from each of two threads. The fetch unit favors high throughput threads, fetching from the two threads that have the fewest instructions waiting to be executed. After being fetched, the instructions are decoded, as indicated in a block 26, and a register handler 28 determines the registers from the register file or resource that will be used for temporarily storing values indicated in the instructions. Thus, the register handler implements the mapping of references to architecturally specified registers to specific renaming registers. The instructions are then inserted into either an integer (INT) instruction queue 30 or a floating point (FP) instruction queue 32. A register resource 37 illustrated in this Figure includes FP registers 34 and INT registers 36. Data output from FP FUs 38 and INT/load-store (LDST) FUs 40 are shifted into a data cache 42, for access by a memory 43. Finally, the instructions are retired in order after their execution is completed.

FIG. 9 illustrates how register handler 28 processes instructions in decoder 26 for each of the contexts of the threads being executed (in which architectural registers 100 and 102 are referenced) to allocate the values for the architectural registers to specific renaming registers 104 and 106. The renaming registers are selected from available renaming registers 108.

Very little new microarchitecture need be designed to implement or optimize the SMT—most components are an integral part of any conventional dynamically-scheduled superscalar. As shown in the top portion of FIG. 2, a conventional superscalar processor includes a fetch stage 44, a decode stage 46, a renaming stage 48, a queue 50, a register read stage 52, an execution stage 54, and a commit stage 56. These elements are also included in the SMT, as shown in the bottom of FIG. 2. The only additions are a larger register file (e.g., 32 architecturally specified registers per thread, plus 100 renaming registers), a register read stage 52' and register write stage 58. The extended (longer) pipeline is needed to access the registers because of the two additional stages. Also needed for the SMT are the instruction fetch mechanism and the register handler mentioned above, and several per-thread mechanisms, including program counters, return stacks, retirement and trap mechanisms, and identifiers in the translation lookaside buffer (TLB) and branch target buffer. Notably missing from this list is special per-thread hardware for scheduling instructions onto the FUs. Instruction scheduling is done as in a conventional out-of-order superscalar, i.e., instructions are issued after their operands have been calculated or loaded from memory, without regard to thread, and the renaming handler eliminates inter-thread register name conflicts by mapping thread-specific architectural registers onto the physical registers.

Instruction-level simulations indicate that this SMT architecture obtains speedups of 64% and 52% over two and four-processor single-chip multiprocessors, respectively, based on benchmarking applications executed from the SPLASH-2 and SPEC suites of benchmarks. (See "The SPLASH-2 Programs: Characterization and Methodological Considerations," S. C. Woo et al., $22^{nd}$ Annual International Symposium on Computer Architecture, pages 23–36, June 1995 and "New CPU Benchmark Suites from SPEC," K. Dixit, COMPCON '92 Digest of Papers, pages 305–310, 1992.) The SMT architecture also achieves instruction throughputs 2.5 times that of the wide-issue superscalar on which it was based, executing a multiprogramming workload of SPEC92 programs. (See "Exploiting Choice: Instruction Fetch and Issue on an Implementable Simultaneous Multithreading Processor," D. M. Tullsen et al., $23^{rd}$ Annual International Symposium on Computer Architecture, pages 191–202, May 1996.)

Register File (Resource) Design

Before discussing various design issues for SMT register files (or register resources), it may be helpful to provide some background on register renaming. A processor's instruction set architecture determines the maximum number of registers that can be used for program values. On a machine with in-order execution, this limited size (typically 32 registers) often introduces artificial constraints on program parallelism, thus reducing overall performance. To keep the FUs busy each execution cycle, dynamically-scheduled processors rely on hardware register renaming to increase the pool of physical registers available to programs. The renaming hardware removes false data dependencies between architectural registers by assigning architectural registers with output or anti-dependencies to different physical registers to expose more instruction-level parallelism.

Because these dynamically-scheduled processors also rely heavily on speculative execution, hardware must be provided to maintain a consistent processor state in the presence of mispredicted branches and processor interrupts and exceptions. Most processors rely on an in-order instruction retirement mechanism to commit physical register values to architectural register state. Two different approaches are used: reorder buffers and register remapping.

Figure 3:
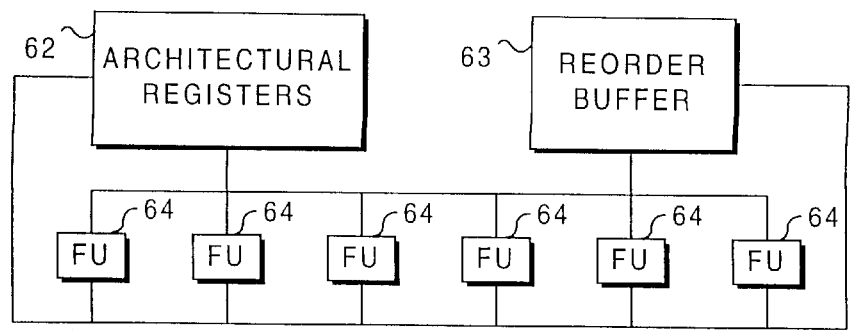
FIG. 3 is a block diagram illustrating a reorder buffer and register renaming in accord with the present invention.

Processors such as the PowerPC 604™, Intel Corporation's Pentium Pro™, and Hewlett Packard Corporation's PA-RISC 8000™ use a reorder buffer 63 (as shown in a block diagram 60 in FIG. 3). The reorder buffer differs slightly in these three processors, but in all cases, it serves two primary purposes, including providing support for precise interrupts, and assisting with register renaming. A set of physical registers backs architectural registers 62 and maintains the committed state of the program (consistent with in-order retirement) when servicing FUs 64. The FUs include such components as an adder, floating point unit, etc.

The reorder buffer itself contains a pool of renaming registers (not separately shown). When an instruction with a register destination is dispatched, a renaming register in the reorder buffer is allocated. When a register operand is needed, the system hardware checks the renaming registers for the current value. If it is there, the instruction retrieves the operand value from the renaming register. If not, the operand is selected from the in-order, consistent set of physical registers. When an instruction retires, the renaming register value is written to the physical register file to update the committed processor state. Because entries in the reorder buffer are maintained in program order, speculative instructions caused by branch misprediction can be squashed by invalidating all reorder buffer entries after the branch. Exceptions can be handled in a similar fashion.

Figure 4:
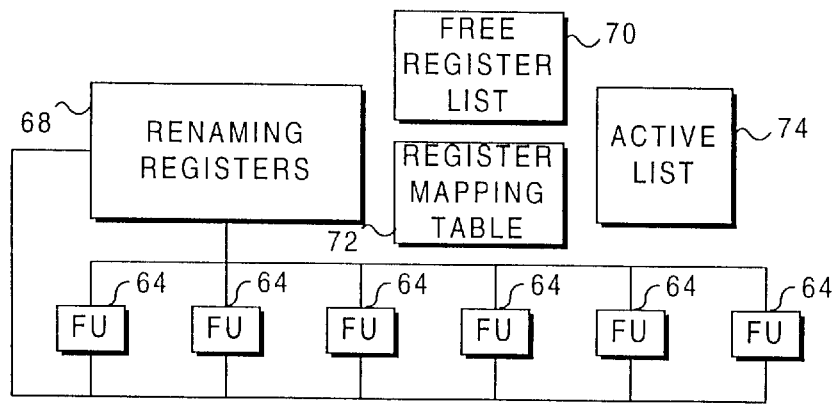
FIG. 4 is a block diagram showing the register renaming mapping table.

The MIPS R10000™ uses a register renaming mapping table scheme, as shown in a block diagram 66 in FIG. 4. An active list 74 keeps track of all uncommitted instructions in the machine, in program order (somewhat similar in functionality to reorder buffer 63 in FIG. 3). The register file includes a large pool of physical registers 68. When a physical register is needed (i.e., when the corresponding architectural register is defined), a mapping is created from the architectural register to an available physical register in a register mapping table 72. Also maintained is a free register list 70.

A four-entry branch stack (not separately shown) is used to support speculative execution. Each entry corresponds to an outstanding, unresolved branch and contains a copy of the entire register mapping table. If a branch is mispredicted, the register mapping table is restored from the corresponding branch stack entry, thus restoring a consistent view of the register state. On an exception, the processor restores the mapping table from the preceding branch and then replays all instructions up to the excepting instruction.

SMT Register File Designs

In the SMT, the register file holds the state of multiple thread contexts. Because threads only access registers from their own context, any of the following four schemes might be used for distributing renaming registers among the contexts of the threads. As described below and as illustrated in FIGS. 5A–5D, register resource 37 (FIG. 1) has a markedly different configuration for each of these techniques.

1. Private Architectural and Private Renamning (PAPR) registers (shown in a block diagram 80 in FIG. 5A): In this scheme, the architectural and renaming registers are physically partitioned among the contexts; each context has its own registers, and each thread only accesses registers from its own context. Thus, a first thread has a set 86 of architecturally specified registers and employs a set 82 of renaming registers, none of which are available for use by any other thread, while a second thread has a set 88 of architecturally specified registers and employs a set 84 of renaming registers, none of which are available for use by any other thread. An advantage of (PAPR) stems from the lower access times of each private register file. The architectural registers and renaming registers in each set provided a thread are only available to service a contexts for that thread. Thus, even though the architectural registers and renaming registers for the third and fourth threads are currently not in use in contexts for those threads, their architectural registers and renaming registers are not available for use by contexts in any other threads.

2. Private Architectural and Shared Renaming (PASR) registers (shown in a block diagram 90 in FIG. 5B): More flexibility can be gained over the PAPR approach by sharing the renaming registers comprising the registers resource across all contexts for all threads. As shown in this example, one or more renaming registers 85 are assigned to the context for the first thread, while one or more renaming registers 87 are assigned to the context for the second thread. By sharing the renaming registers, the PASR scheme exploits variations in register requirements for the threads, thereby providing better utilization of the renaming registers.

Figure 5A:
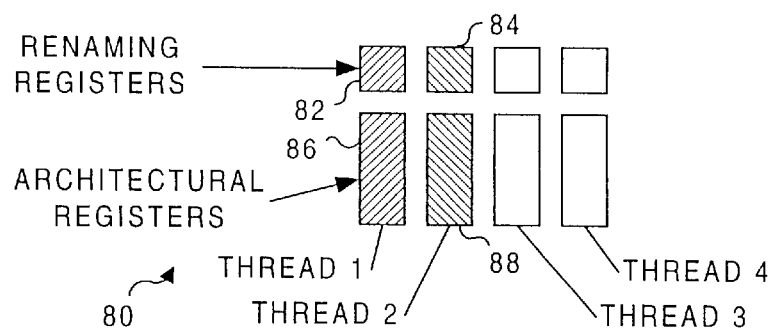
FIGS. 5A–5D are block diagrams illustrating logical register file configurations for private architectural and private renaming (PAPR) registers, private architectural and shared renaming (PASR) registers, semi-shared architectural and shared renaming (SSASR) registers, and fully shared registers (FSR), respectively.
Figure 5B:
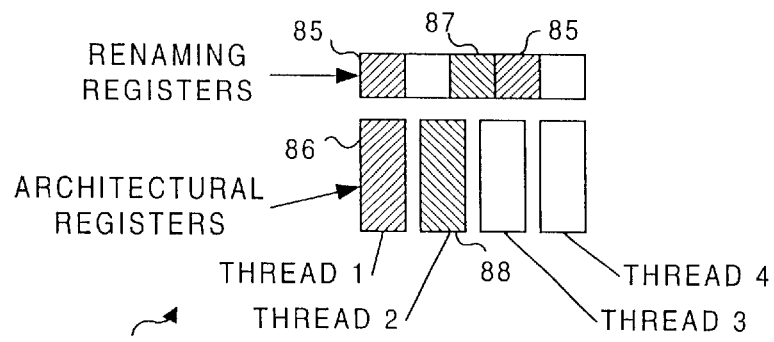
Figure 5C:
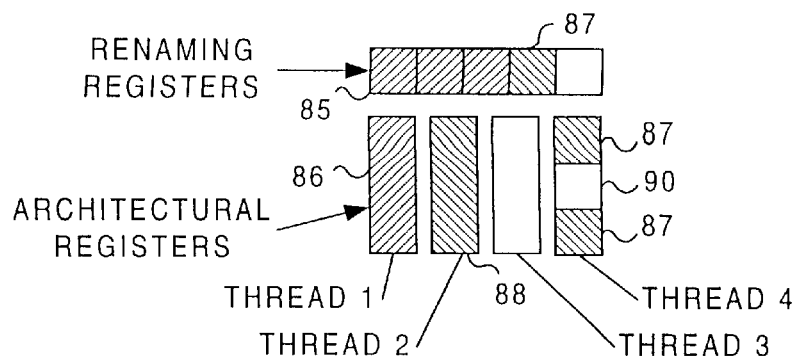
Figure 5D:
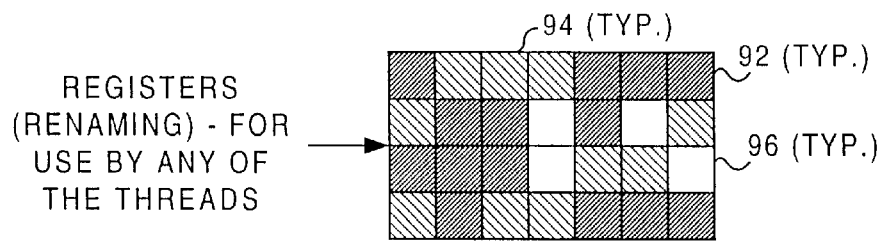
Figure 6A:
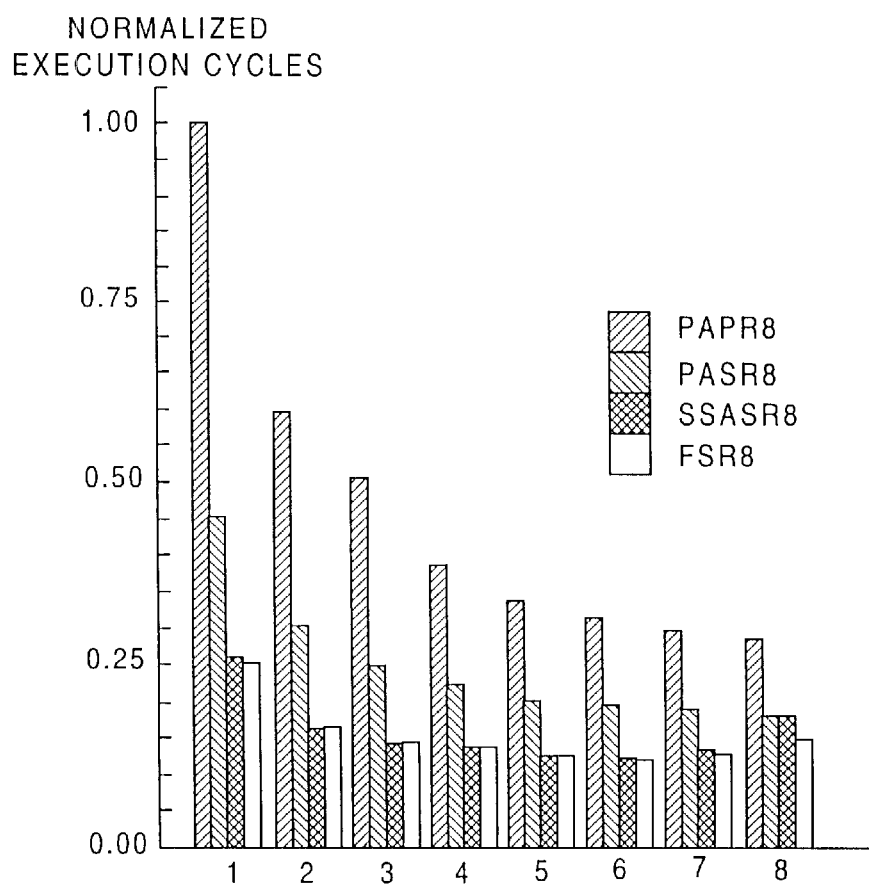
FIGS. 6A–6D are graphs showing the number of normalized executions cycles for the four register file configurations noted in FIGS. 5A–5D, for register file sizes of 264, 272, 288, and 352 registers, respectively.
Figure 6B:
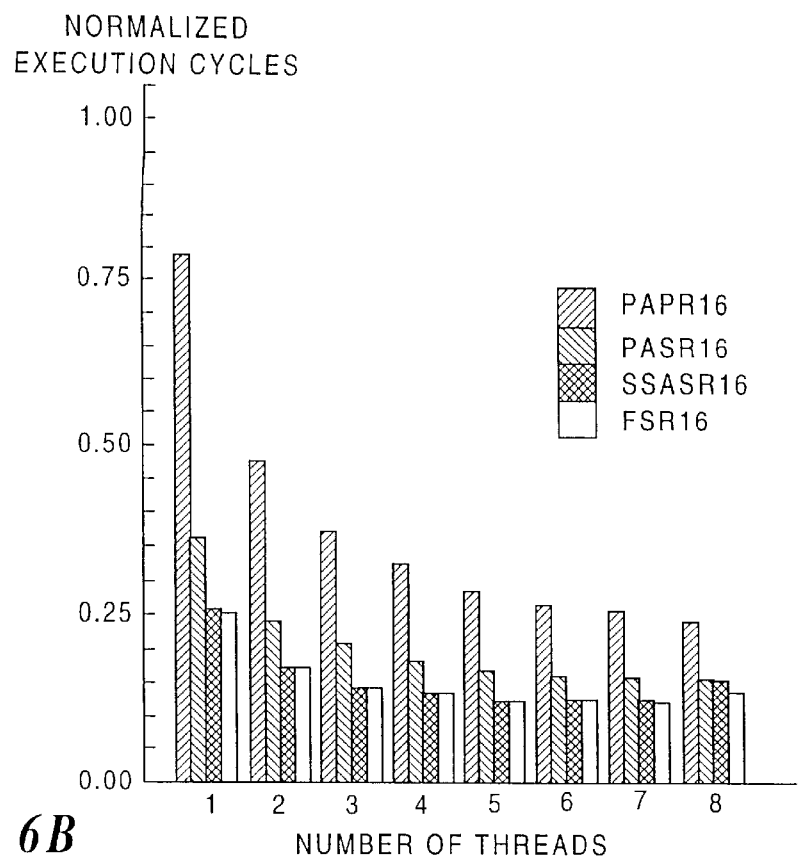
Figure 6C:
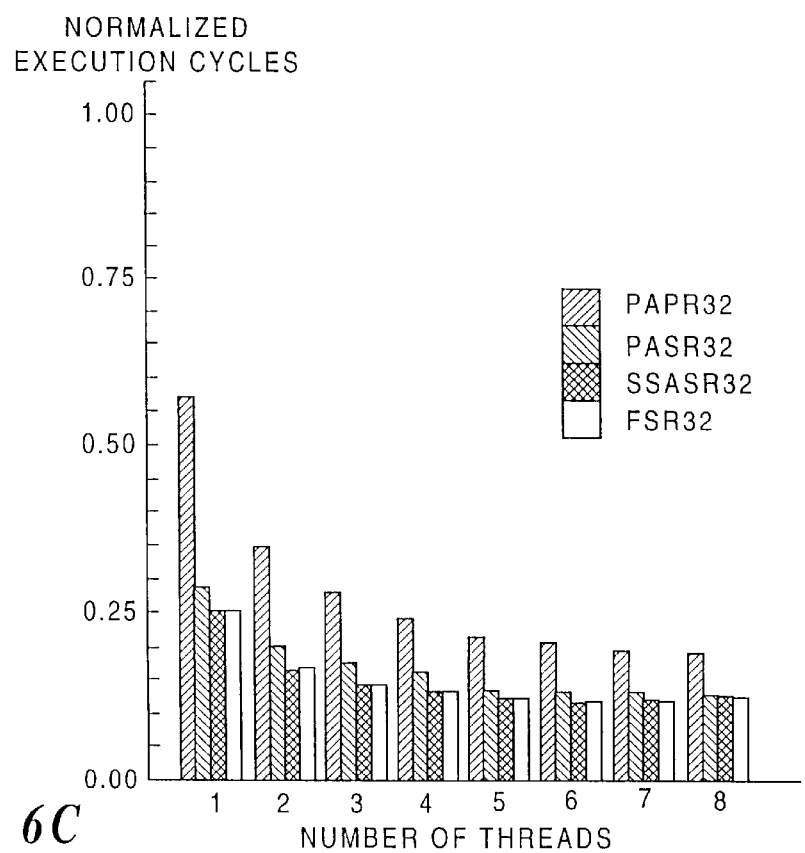
Figure 6D:
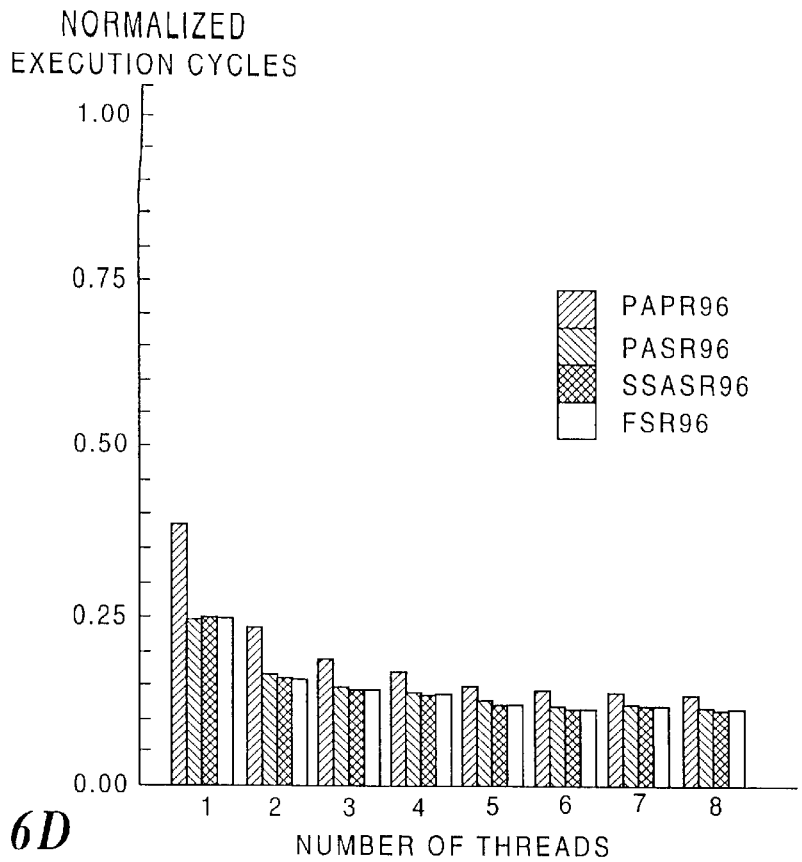

3. Semi-Shared Architectural and Shared Renaming (SSASR) registers (shown in FIG. 5C): This register resource configuration scheme is based on the observation that a parallel program might execute on an SMT with fewer threads than the number of hardware contexts. In this situation, the architectural registers for the idle hardware contexts might go unused. In the SSASR scheme, architectural registers 90 of idle contexts are usable as renaming registers for any loaded contexts, e.g., they may be used as renaming registers 87 for the context of the first thread as shown in FIG. 5C. The SSASR scheme requires additional operating system and/or runtime system support to guarantee the availability of the idle architectural registers. For example, a parallel application might be running with only six threads, so that two idle contexts are available. If another application is started, register handler 28 must allow the new thread to reclaim its architectural registers (which have been used as renaming registers by the first application). Despite this requirement, the scheme is attractive because it enables higher utilization of the architectural registers, and it opens the possibility of achieving better performance with fewer threads, each using more registers.

4. Fully Shared Registers (FSR) (shown in FIG. 5D): This final approach is the most flexible technique for managing registers. In FSR, the entire register file or resource is managed as a single pool of registers, i.e., any available register 96 can be allocated for use as a renaming register 92 for used in the context of any thread, or can be allocated as a renaming register 94 for use by the context of any other thread, as required. FSR is essentially an extension of the register mapping scheme to multiple threads, employing a register resource in which no register is private to any context of any thread.

PAPR could be implemented in processors that rely on either reorder buffers or register mapping for register renaming. PASR and SSASR are more appropriate for processors that employ reorder buffers. FSR requires a register mapping scheme, but might actually prove to be less complex than PASR and SSASR, because a separate mapping table could be kept for each context (for per-context retirement), and all registers can be used equally by all threads.

Simulation Methodology To evaluate these various register resource configurations (as well as the other aspects of the SMT reported herein), applications from the SPEC92, SPEC95 and SPLASH-2 benchmark suites were used. For the two SPEC benchmarks, the Stanford University intermediate format (SUIF) compiler was used to parallelize the applications; the SPLASH-2 programs were explicitly parallelized by the programmer. The primary focus was directed to parallel applications for two reasons. First, the threads of parallel programs tend to demand registers of the same type (integer or floating point) at the same time, so pressure on the physical registers can be greater than for independent sequential programs. Second, parallel applications can leverage SMT's multiple hardware contexts to potentially improve single-program performance. Specifically, in the SSASR and FSR schemes, reducing the number of threads allocated to the application increases the number of registers available per remaining thread. The tests discussed below evaluate the optimal thread/register trade-off for these applications.

For all programs in the evaluation workload, the Multiflow™ trace scheduling compiler was used to generate Digital Equipment Corporation Alpha™ object files. This compiler generates high-quality code, using aggressive static scheduling for wide issue, loop unrolling, and other instruction level parallelism (ILP)-exposing optimizations. These object files are linked with modified versions of the Argonne National Laboratories (ANL) and SUIF runtime libraries to create executable files.

The SMT simulator employed in these evaluations processes unmodified Alpha™ executable files and uses emulation-based, instruction-level simulation to model in detail the processor pipelines, hardware support for out-of-order execution, and the entire memory hierarchy, including translation lookaside buffer (TLB) usage. The memory hierarchy in the simulated processor includes three levels of cache, with sizes, latencies, and bandwidth characteristics, as shown in Table 1. The cache behavior, as well as the contention at the L1 banks, L2 banks, L1–L2 bus, and L3 bank are modeled. For branch prediction, a 256-entry, four-way set associative branch target buffer and a 2 K×2-bit pattern history table are used.

registers total), 16 (272 registers total), and 32 (288 registers total). Table 2 describes each of these configurations.

TABLE 2

Description of register file configurations used in this study.

| Configuration | Total physical registers | Architectural registers | Renaming registers |
|---|---|---|---|
| PAPR8 | 264 | 32/context | 1/context |
| PASR8 | 264 | 32/context | 8 |
| SSASR8 | 264 | 32/context | 8 |
| FSR8 | 264 | — | 264 |
| PAPR16 | 272 | 32/context | 2/context |
| PASR16 | 272 | 32/context | 16 |
| SSASR16 | 272 | 32/context | 16 |
| FSR16 | 272 | — | 272 |
| PAPR32 | 288 | 32/context | 4/context |
| PASR32 | 288 | 32/context | 32 |
| SSASR32 | 288 | 32/context | 32 |
| FSR32 | 288 | — | 288 |
| PAPR96 | 352 | 32/context | 12/context |
| PASR96 | 352 | 32/context | 96 |
| SSASR96 | 352 | 32/context | 96 |
| FSR96 | 352 | — | 352 |

For PAPR, PASR, and SSASR, the naming convention used above identifies how many additional registers are provided for renaming, beyond the required 256 architectural registers. For example, PAPR8 has 256+8=264 registers. For FSR, all registers are available for renaming, so the

TABLE 1

SMT memory hierarchy.

|  | L1 I-cache | L1 D-cache | L2 cache | L3 cache |
|---|---|---|---|---|
| Size | 32 KB | 32 KB | 256 KB | 8 MB |
| Associativity | direct-mapped | direct-mapped | 4-way | direct-mapped |
| Line size (bytes) | 64 | 64 | 64 | 64 |
| Banks | 8 | 8 | 8 | 1 |
| Transfer time/bank | 1 cycle | 1 cycle | 1 cycle | 4 cycle |
| Accesses/cycle | 2 | 4 | 1 | ¼ |
| Cache fill time (cycles) | 2 | 2 | 2 | 8 |
| Latency to next level | 6 | 6 | 12 | 62 |

Because of the length of the simulations, the detailed simulation results were limited to the parallel computation portion of the applications (which is the norm for simulating parallel applications). For the initialization phases of the applications, a fast simulation mode was used, which only simulates the caches, so that they were warm when the main computation phases were reached. A detailed simulation mode was then turned on for this portion of program execution. For some applications, the number of iterations were reduced, but the data set size was kept constant to ensure realistic memory system behavior.

Register File Design Experimental Results

In this section, the performance of the four register file configurations described above was evaluated. For each of the four configurations, the evaluation began with a total register file size of 256 architectural registers (eight 32-register contexts), plus 96 renaming registers, or 352 physical registers total. (The SMT originally had 356 registers, including: eight contexts*32 registers/context+100 renaming registers. A total size of 256+96 registers was used in these experiments, because it is easier to divide among eight contexts.) To determine the sensitivity of these schemes to register file size, three register files that have fewer renaming registers were also studied, i.e., eight (264 configuration number simply indicates the number of additional registers above the 256 architectural registers, to comply with the naming of the other schemes. Thus, FSR96 and PAPR96 both have 352 registers in their INT and FP register files.

Register availability is critical to good performance, because instruction fetching can stall when all renaming registers have been allocated. Table 3 shows the average frequency of instruction fetch stalls in the application of the present invention for the four configurations, each with four register file sizes, and for a varying number of threads. Overall, the data indicate that the lack of registers is a bottleneck for smaller register file sizes, and the more rigidly partitioned register file schemes. For a fixed register file size and a fixed number of threads, the more flexible schemes are able to put the shared registers to good use, reducing the frequency of fetch stalls. In fact, for both SSASR and FSR, the register file ceases to be a bottleneck for smaller numbers of threads. For all register configurations, increasing the number of physical registers usually decreases stalls.

The sensitivity of instruction fetch stalling to the number of executing threads depends on the register configuration. PAPR has a fixed number of registers available to each thread, regardless of the number of threads; adding threads simply activates idle register contexts. Therefore, PAPR's stall frequency is fairly uniform across different numbers of threads. At eight threads (the maximum), stalling actually drops; eight threads provides the greatest choice of instructions to issue, and the resulting better register turnover translates into few stalls. The other schemes restrict the number of registers per thread as more threads are used, and their results reflect the additional register competition. For SSASR and FSR, which make both renaming and architectural registers available to all threads, serious stalling only occurs with the maximum number of threads.

TABLE 3

Percentage of total execution cycles with fetch stalls because no renaming registers are available.

| Configuration | Integer Registers | | | | Floating Point (FP) Registers | | | |
|---|---|---|---|---|---|---|---|---|
| | Number of Threads | | | | | | | |
| | 1 | 2 | 4 | 8 | 1 | 2 | 4 | 8 |
| PAPR8 | 54.7 | 58.0 | 58.6 | 57.2 | 38.8 | 36.6 | 33.1 | 27.6 |
| PASR8 | 50.3 | 54.3 | 56.0 | 53.5 | 40.4 | 37.6 | 32.7 | 25.5 |
| SSASR8 | 42.2 | 46.3 | 47.3 | 43.1 | 43.6 | 40.2 | 33.3 | 23.0 |
| FSR8 | 28.2 | 31.6 | 27.8 | 24.7 | 42.6 | 40.1 | 26.2 | 15.0 |
| PAPR16 | 36.0 | 38.9 | 44.9 | 43.1 | 42.2 | 35.3 | 32.0 | 21.3 |
| PASR16 | 25.2 | 30.8 | 32.9 | 34.2 | 41.4 | 41.6 | 31.9 | 17.0 |
| SSASR16 | 11.8 | 21.1 | 21.5 | 23.7 | 41.7 | 42.1 | 29.0 | 11.9 |
| FSR16 | 0.0 | 4.9 | 3.4 | 7.9 | 2.0 | 25.7 | 19.8 | 9.0 |
| PAPR32 | 0.0 | 0.0 | 1.8 | 43.2 | 0.0 | 0.0 | 8.0 | 21.3 |
| PASR32 | 0.0 | 0.0 | 1.6 | 34.1 | 0.0 | 0.0 | 4.2 | 17.0 |
| SSASR32 | 0.0 | 0.0 | 1.3 | 23.2 | 0.0 | 0.0 | 5.0 | 12.1 |
| FSR32 | 0.0 | 0.0 | 0.7 | 7.9 | 0.0 | 0.0 | 0.3 | 9.0 |
| PAPR96 | 0.0 | 0.0 | 1.8 | 32.5 | 0.0 | 0.0 | 7.9 | 14.9 |
| PASR96 | 0.0 | 0.0 | 1.6 | 27.1 | 0.0 | 0.0 | 6.9 | 12.6 |
| SSASR96 | 0.0 | 0.0 | 1.3 | 20.1 | 0.0 | 0.0 | 5.1 | 9.5 |
| FSR96 | 0.0 | 0.0 | 0.7 | 7.6 | 0.0 | 0.0 | 0.3 | 8.8 |

Variations in the results between the two types of registers (INT and FP) can be attributed to different data type usage in the applications. Although the programs tend to be FP intensive, INT values have longer lifetimes.

The stall frequency data shown in Table 3 is useful for understanding the extent of the register bottleneck, but not its performance impact. The performance effect of the options studied is illustrated in the graphs of FIGS. 6A–6D, which show total execution cycles (normalized to PAPR8 with 1 thread) for the workload. Each graph compares the four register organization schemes for a different total register file size, i.e., 264 registers, 272 registers, 288 registers, and 352 registers.

From FIGS. 6A–6D, it will be apparent that the more restrictive schemes, PAPR and RASR, are always at a disadvantage relative to the more flexible schemes, SSASR and FSR; however, that disadvantage decreases as the register file size increases. Thus, if large register files are an option, the more restrictive schemes may be used with satisfactory performance. If a smaller register file size is a crucial goal, the shared-register schemes can be used to obtain "large register file performance." For example, with eight threads, the performance of FSR16, with 272 total registers, matches that of PAPR96 with 352 registers.

It is interesting to note that a shared-register scheme, such as FSR, addresses a concern about multithreaded architectures, namely, their (possibly reduced) performance when only a single thread is executing. Because FSR can concentrate all of its register resources on a solitary thread, when only one thread is running, FSR8 shows a 400% speedup when compared to PAPR8.

FIGS. 7A–7D plot the same data, but each graph shows the effect of changing register file size for a single register organization scheme. From these FIGURES, it will be evident that the addition of registers has a much greater impact for the more restrictive schemes than for the flexible schemes. More important, it will be noted that for SSASR and FSR, performance is relatively independent of the total number of registers, i.e., the bars for FSR8 and FSR96 are very similar. For less than eight executing threads, FSR8 and FSR96 differ by less than 10%.

Figure 7A:
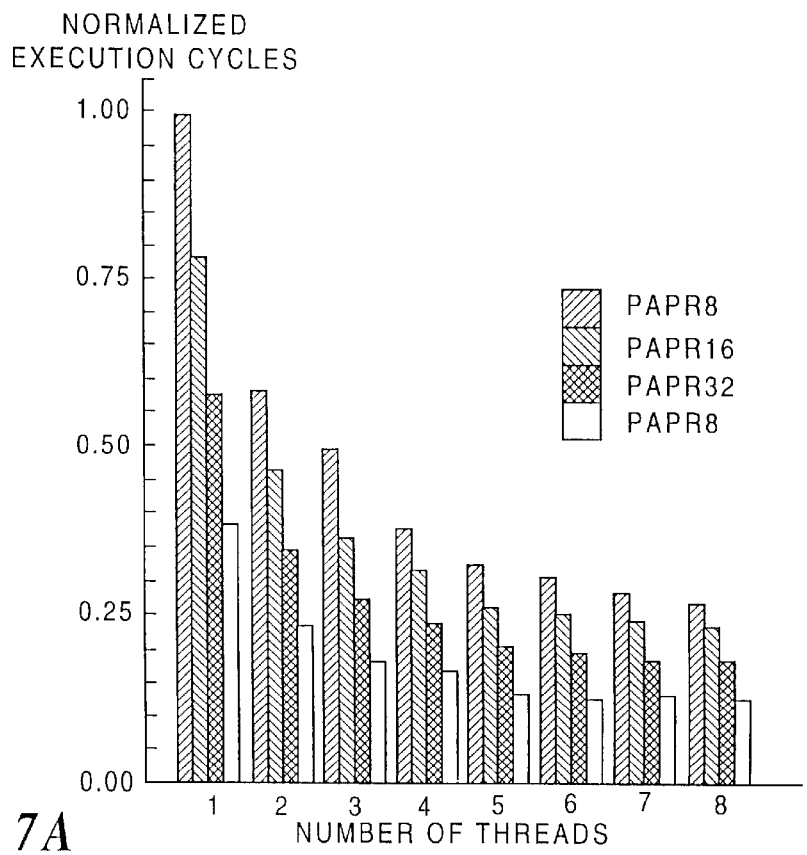
FIGS. 7A–7D are graphs showing the number of normalized executions cycles for each of the four register file configurations noted in FIGS. 5A–5D, respectively, as the size of the register file is increased from one to eight threads.
Figure 7B:
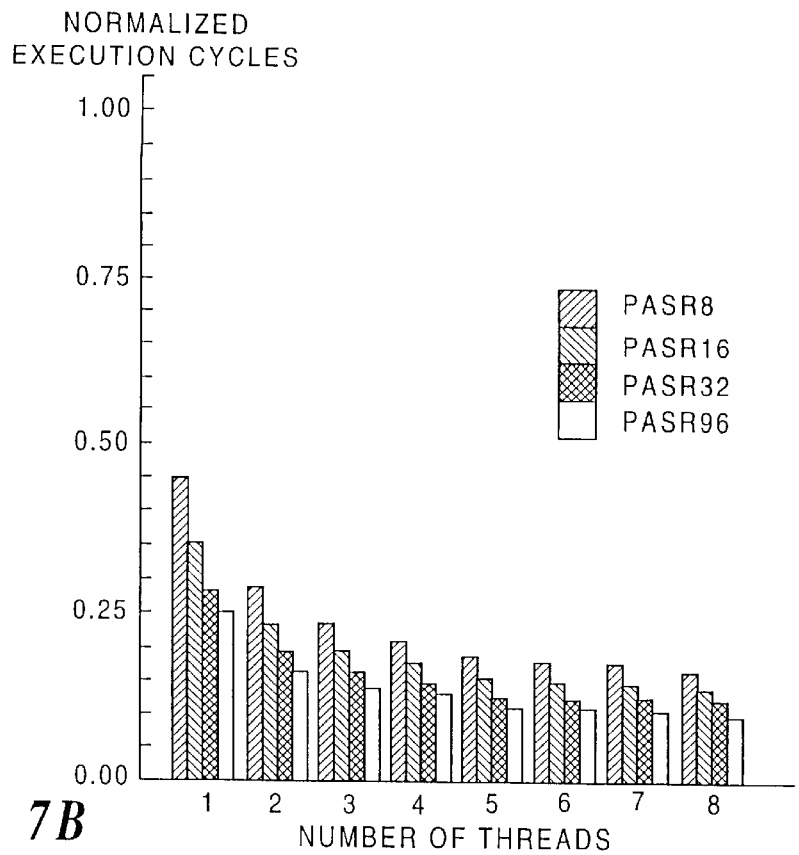
Figure 7C:
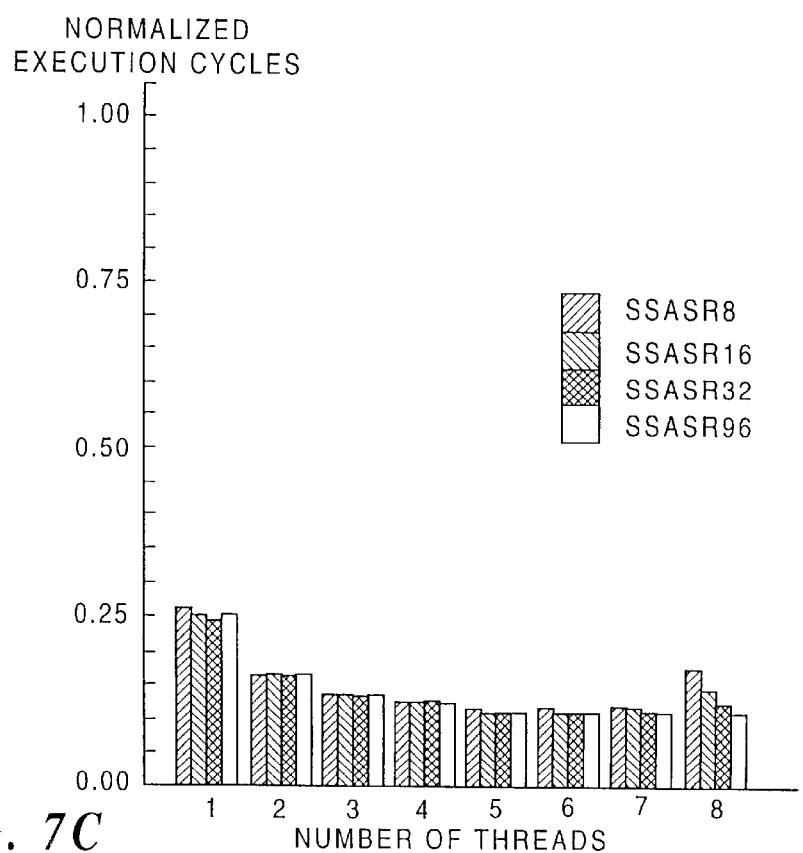
Figure 7D:
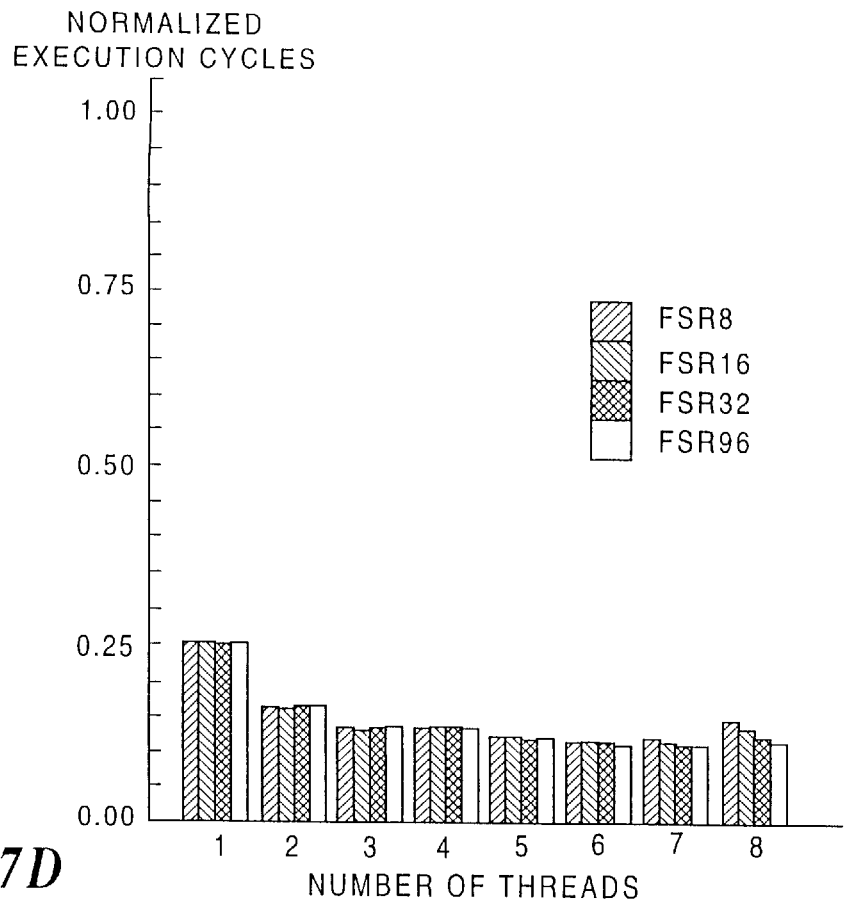
Figure 8:
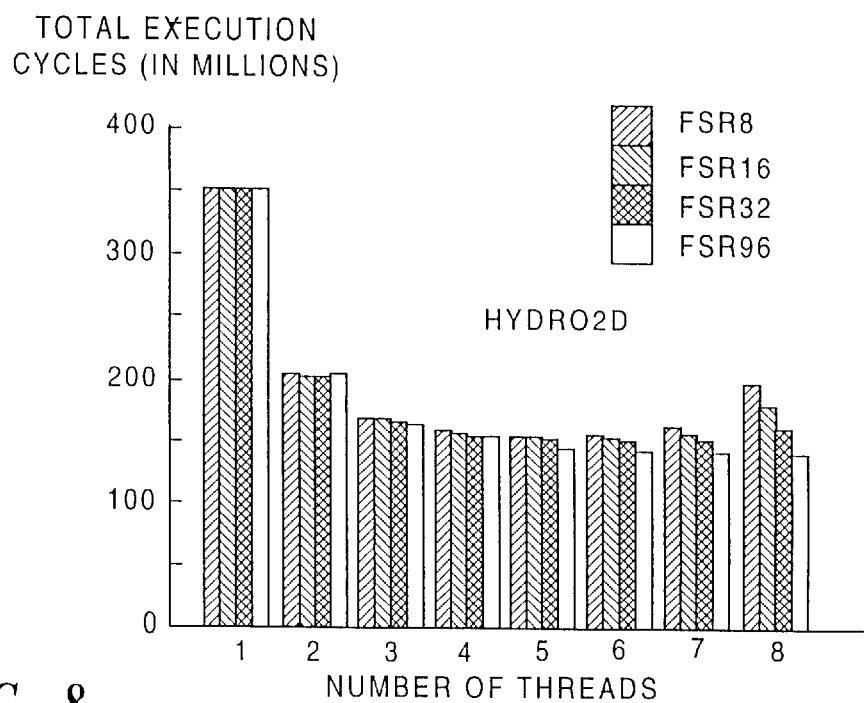
FIG. 8 is a graph illustrating the total number of execution cycles for the hydro2d benchmark, for FSR8, FSR16, FSR32, and FSR96, as the size of the register file is increased from one to eight threads.
Figure 12E:
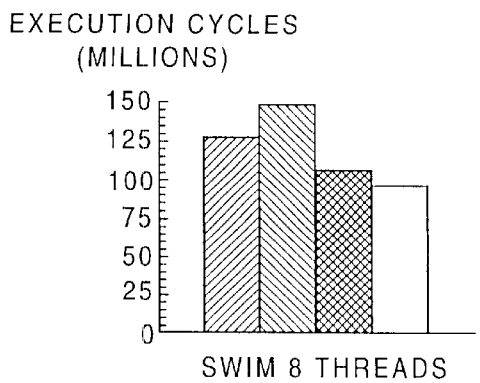
FIG. 12E is a graph illustrating the execution cycles performed during execution of the Swim benchmark for the FSR8 configuration when implementing no register freeing mechanism, and when implementing the free register, free mask, and free register bit register freeing mechanisms.
Figure 12F:
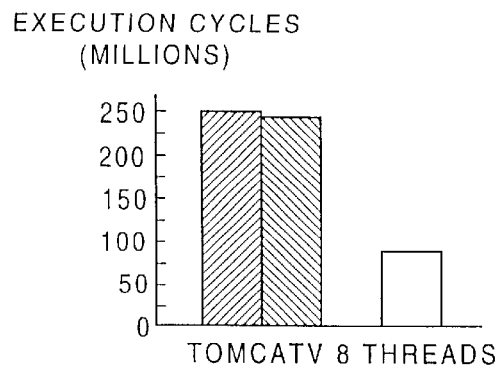
FIG. 12F is a graph illustrating the execution cycles performed during execution of the Tomcatv benchmark for the FSR8 configuration when implementing no register freeing mechanism, and when implementing the free register, and free register bit register freeing mechanisms.
Figure 12G:
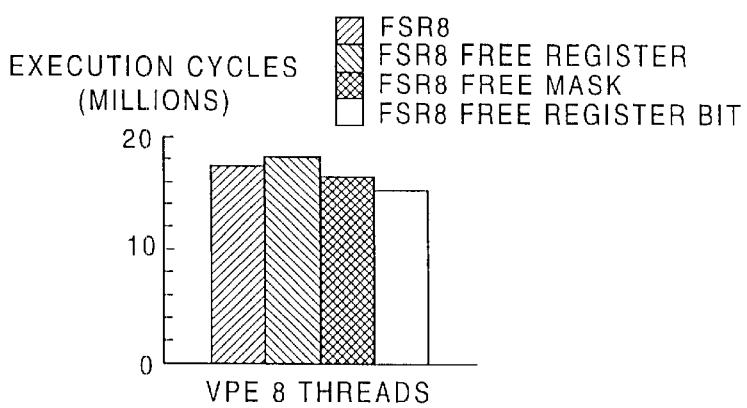
FIG. 12G is a graph illustrating the execution cycles performed during execution of the Vpe benchmark for the FSR8 configuration when implementing no register freeing mechanism, and when implementing the free register, free mask, and free register bit register freeing mechanisms.
Figure 13A:
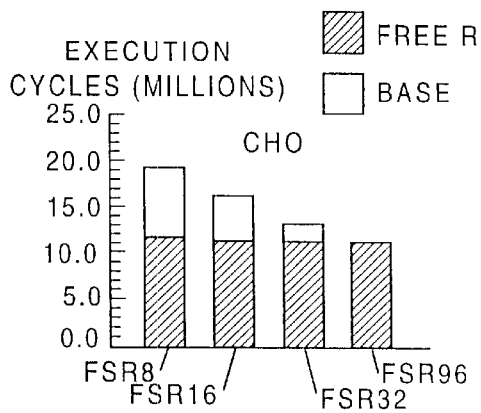
FIG. 13A is a graph comparing the execution cycles (or tim) required during execution of the Cho benchmark when employing a base configuration (ie., no register freeing mechanism) and the free register bit mechanism under various FSR schemes of different configurations with eight threaders.
Figure 13B:
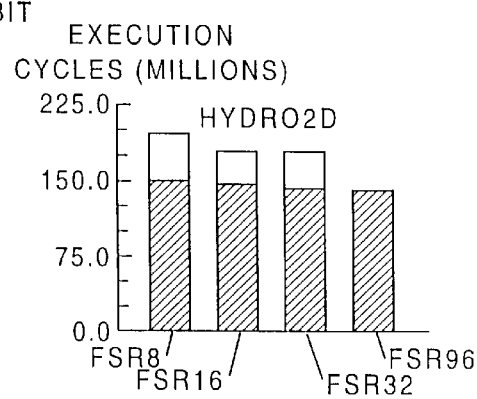
FIG. 13B is a graph comparing the execution cycles (or time) required during execution of the Hydro2D benchmark when employing the base configuration and the free register bit mechanism under various FSR schemes of different configurations with eight threads.
Figure 13C:
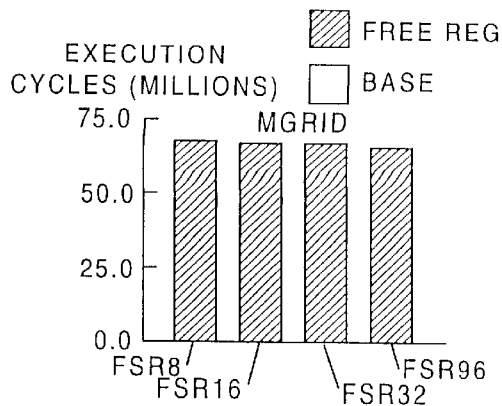
FIG. 13C is a graph comparing the execution cycles (or time) required during execution of the Mgrid benchmark when employing the base configuration and the free register bit mechanism under various FSR schemes of different configurations with eight threads.
Figure 13D:
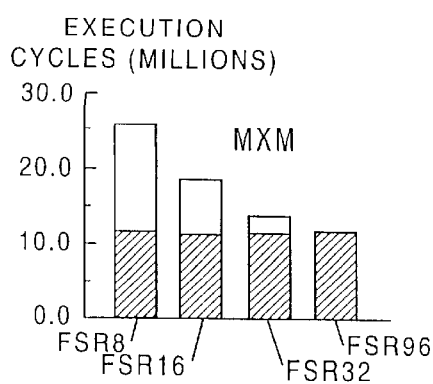
FIG. 13D is a graph comparing the execution cycles (or time) required during execution of the Mxm benchmark when employing the base configuration and the free register bit mechanism under various FSR schemes of different configurations with eight threads.
Figure 13E:
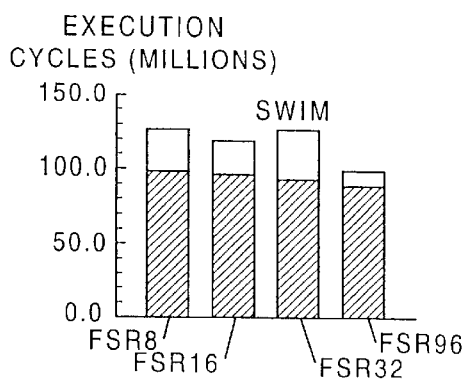
FIG. 13E is a graph comparing the execution cycles (or time) required during execution of the Swim benchmark when employing the base config on and the free register bit mechanism under various FSR schemes of different configurations with eight threads.
Figure 13F:
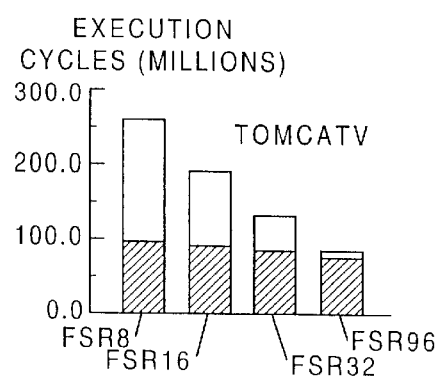
FIG. 13F is a graph comparing the execution cycles (or time) required during execution of the Tomcatv benchmark when employing the base configuration and the free register mechanism under various FSR schemes of different configurations with eight threaders.
Figure 13G:
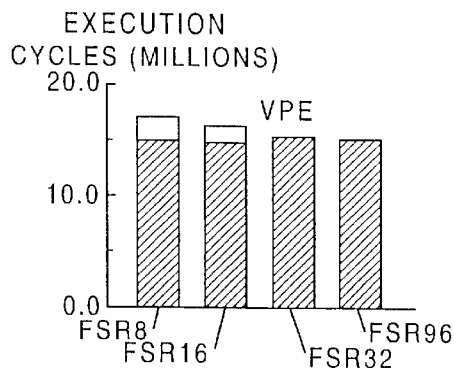
FIG. 13G is a graph comparing the execution cycles (or time) required during execution of the Vpe benchmark when employing the base configuration and the fre register bit mechanism under various FSR schemes of different configurations with eight threads.
Figure 14A:
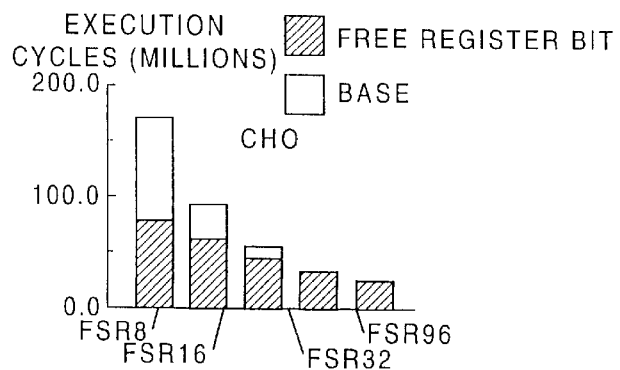
FIG. 14A is a graph comparing the execution cycles (or time) required during execution of the Cho benchmark when employing the base configuration and the free register bit mechanism for five different PAPR file sizes.
Figure 14B:
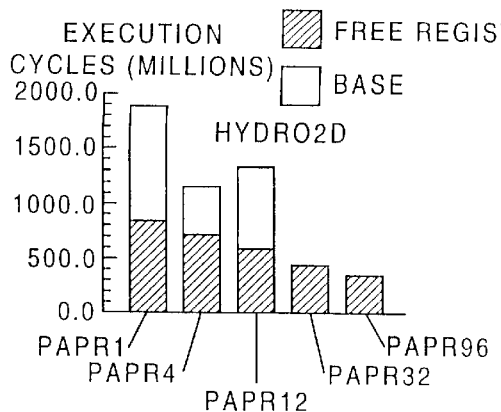
FIG. 14B is a graph comparing the execution cycles (or time) required during execution of the Hydro2d benchmark when employing the base configuration and the free register bit mechanism for five different PAPR file sizes.
Figure 14C:
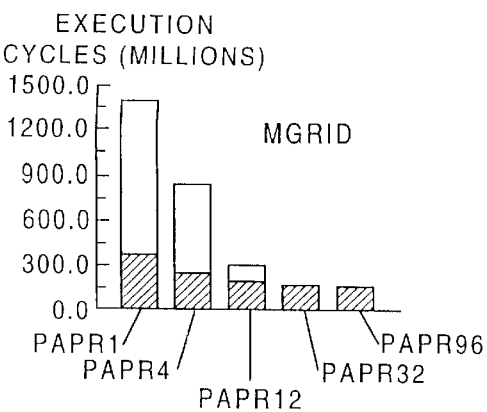
FIG. 14C is a graph comparing the execution cycles (or time) required during execution of the Mgrid benchmark when employing the base configuration and the free register bit mechanism for five different PAPR file sizes.
Figure 14D:
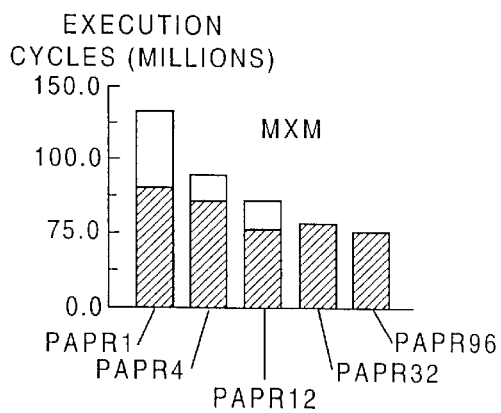
FIG. 14D is a graph comparing the execution cycles (or time) required during execution of the Mxm benchmark when employing the base configuration and the free register bit mechanism for five different PAPR file sizes.
Figure 14E:
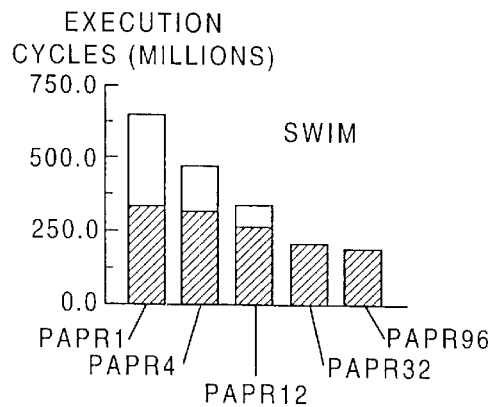
FIG. 14E is a graph comparing the execution cycles (or time) required during execution of the Swim benchmark when employing the base configuration and the fire register bit mechanism for five different PAPR file sizes.
Figure 14F:
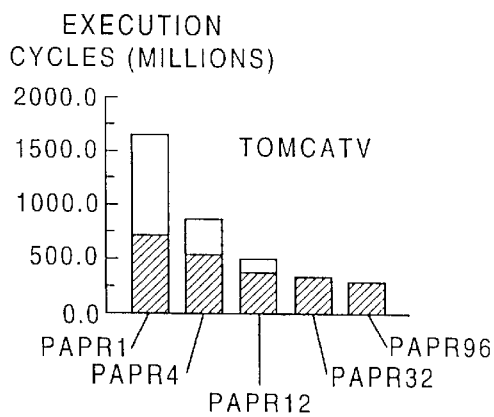
FIG 14F is a graph comparing the execution cycles (or time) required during execution of the Tomcatv benchmark when employing the base configuration and the free register bit mechanism for five different PAPR file sizes.
Figure 14G:
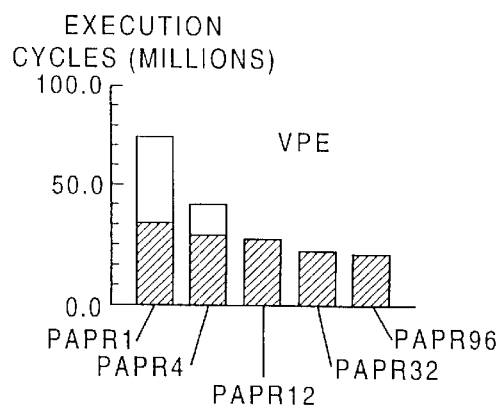
FIG. 14G is a graph comparing the execution cycles (or time) required during execution of the VPE benchmark when employing the base configuration and the free register bit mechanism for five different PAPR file sizes.

Finally, FIGS. 7C–7D indicate that for FSR and SSASR, some applications attain their best performance with fewer than eight threads. For the register-sharing schemes, reducing the number of threads increases the number of registers available to each thread. For register-intensive applications, such as "hydro2d" (shown in FIG. 8), better speedup is achieved by additional per-thread registers, rather than increased thread-level parallelism. There are three primary reasons for this result. First, some applications have high utilization with five threads (e.g., 5.6 instructions per cycle for LU). Thus, further improvement with additional threads can only be marginal. Second, increased memory contention can degrade performance with more threads (e.g., adding threads in "swim" increases LI cache bank conflicts). Third, the poor speedup of some programs, such as "vpe," is due to long memory latencies; adding more threads decreases the average number of physical registers available to each thread, limiting each thread's ability to expose sufficient parallelism to hide memory latency.

In summary, the ratio of physical to architectural registers on modern processors, such as the MIPS R10000™ and Digital Equipment Corporation's Alpha 21264™, is often greater than two-to-one. With flexible sharing of registers, an SMT processor can maintain good performance and support for multiple threads, while keeping the number of physical registers nearly equivalent to the number of architectural registers (e.g., 264 vs. 256 for FSR8), and deliver enhanced performance to a solitary thread by making registers in unused contexts available to that thread.

Register File Access Time And Implementation Trade-Offs

The access time to a large, multi-ported register file can be a concern when building processors with high clock rates. Although it is difficult to determine precise cycle times without actually implementing the processor, ballpark estimates can be obtained with a timing model. The intent of this section is to illustrate the trade-offs between cycle time and implementation complexity for the four SMT register file designs.

Farkas, Jouppi, and Chow's register file timing model was used to determine the access times reported and was extended for use with a 0.35 μm process device. The model is useful for obtaining relative access times and approximate performance slopes, rather than accurate absolute values. For example, the recently-announced Digital Equipment Corporation Alpha™ 21264 INT register file has 80-INT registers, with four read ports and four write ports. According to the model, the access time for such a register file is 2.5 ns, while the 21264 is intended to run at a minimum of 500 MHz (a 2 ns cycle time). Nonetheless, the model is suitable for providing insights into cycle time trade-offs for various register file configurations.

Although the four register file designs contain 264, 272, 288, and 352 total physical registers, the actual implementation of these schemes may not require monolithic register files that large. With reorder buffers, the architectural and renaming registers are split, so that register access time is limited by the larger of the two. Mapping tables, on the other hand, have a single pool of physical registers that must be accessed. For each of the four SMT register files, there are a variety of implementations and therefore, cycle times.

PAPR: Because each thread has its own private register set, the contexts could be implemented as eight separate, and therefore, smaller register files, using either reorder buffers or mapping tables. According to the model, assuming SMT's 12 read ports and 6 write ports, the access times of the register files range from 2.6 ns to 3.0 ns, depending on the number of renaming registers. This contrasts with 3.8 ns access time required for a single register file with 352 registers. However, because of the full connectivity between SMT functional units and register contexts, an additional level of logic (a multiplexor) would slightly extend the smaller access time.

PASR: Register file access is limited by the 2.6 ns access time of the 32 architectural registers for PASR8, PASR16, and PASR32, since the pool of renaming registers is smaller. For PASR96, the 96-register renaming pool determines the access time (3.0 ns).

SSASR: Although active contexts have a private set of architectural registers, the registers of idle contexts must be accessible. One implementation consists of eight separate architectural register files and one renaming register file. When a thread needs a register, it selects between its architectural register set, the renaming registers, and the registers of an idle context. The access time to the individual register files is 2.6 ns for SSASR8, SSASR16, or SSASR32, and 3.0 for SSASR96, plus a slight additional delay for the selection mechanism. An alternative implementation could use a single register file, and therefore require cycle times of 3.6 ns (SSASR8, SSASR16, and SSASR32), and 3.8 ns, (SSASR96).

FSR: The register mapping scheme can be extended to multiple threads to implement FSR. Each thread has its own mapping table, but all threads map to the same pool of registers; therefore, access time is that of a single monolithic register file (the access times of the second SSASR implementation).

Although the register file size can have a big impact on its access time, the number of ports is the more significant factor. Limiting the connectivity between the functional units and the register file would reduce the number of ports; there are two other alternatives, as described below.

One approach replicates the register file, as in the 21264, trading off chip real estate for cycle time improvement. In this design, half of the functional units read from one register file, while the remaining units read the other; hence each requires half the number of read ports. All functional units write to both register files to keep their contents consistent. As an example, by cutting the number of read ports in half to six, the access time for FSR96 would be reduced by 12% (from 3.8 ns to 3.4 ns). A second approach reduces the number of ports by decreasing the number of functional units. Here the tradeoff is between cycle time and instruction throughput. As an example, the access times for a register resource having six integer FUs (12 read ports, six write ports) was compared with the access times for a register file having only four FUs (eight read ports, four write ports); the configuration with fewer FUs has access times 12% and 13% lower for register resource sizes 352 and 264, respectively. For programs, such as "vpe," in which performance is limited by factors other than the number of FUs (such as fetch bandwidth or memory latencies), the trade-off is a net win. Although "vpe" requires 1% more execution cycles with only four integer FUs, total execution time is reduced because of the lower cycle time. On the other hand, in INT-unit-intensive applications like lower unit decomposition (LU), total execution time increases with fewer integer units, because the 25% increase in total cycles dwarfs the cycle time improvements. LU illustrates that when sufficient instruction-level and thread-level parallelism exist, the throughput gains of wider machines can overcome the access time penalties of register files with more ports. The model and the experimental measurements described in this section are only meant to provide guidelines for SMT register file design. Ultimately, register file access times will be determined by the ability of chip designers to tune register file designs.

Exposing Register Deallocation to the Software—Motivation

In the previous sections, hardware register renaming was discussed in the context of allocating physical registers to remove false dependencies. The renaming hardware is also responsible for freeing registers, i.e., invalidating mappings between architectural and physical registers. Most out-of-order processors provide speculative execution and precise interrupts. In order to preserve correct program behavior in the face of exceptions and branch mispredictions, dynamically-scheduled instructions must be retired in program order. In-order instruction retirement involves deallocating physical registers, also in program order. When a register is deallocated, its contents may be overwritten. Consequently, a physical register can only be freed when the hardware can guarantee that the register's value is "dead," i.e., its contents will not be used again, as illustrated in FIG. 10. In this Figure, Instruction 1 defines r20, creating a mapping to a renaming register, e.g., P1. Instruction 3 is the last use of r20. P1 cannot be freed until r20 is redefined in Instruction 6. In this example, several instructions and potentially, a large number of cycles can pass between the last use of P1 (r20) and its deallocation. This inefficient use of registers illustrates the inability of the hardware to efficiently manage renaming registers. The hardware cannot tell if a particular register value will be reused in the future, because it only has knowledge of when a register is redefined, but not when it is last used. Thus, the hardware conservatively deallocates the physical register only when the architectural register is redefined.

In contrast, a compiler can identify the last use of a register value. However, current compilers/processors lack mechanisms to communicate this information to the hardware. In this section, several mechanisms that expose register deallocation to the compiler so that it can enable earlier reuse of a register are proposed and evaluated. These mechanisms thus demonstrably provide more efficient use of the registers provided a processor.

First, it is helpful to note the experimental justification for the techniques. For several programs in a workload, the lifetimes of register values were tracked, and the wasted cycles in each lifetime were determined. Specifically, the number of instructions and cycles between the last use of a register value and the cycle in which the register was freed were counted (called the "dead register distance"). Table 4 shows the number of cycles and instructions averaged over all register values for four different register file sizes for FSR. Instructions that use and redefine the same register contribute no waste cycles. The data illustrate that a large number of cycles often passes between the last use of a register value and the cycle in which the register is freed. The previous section in this disclosure showed that smaller register files stall more frequently, because no renaming registers are available. Table 4 suggests that more efficient register deallocation could prove beneficial to addressing this prospective register shortage. All of this material suggests that if registers are managed more efficiently, performance can be recouped, and even a 264 register FSR might be sufficient.

Five Solutions:

Using dataflow analysis, the compiler can reduce the dead register distance by identifying the last use of a register value. In this section, five alternative instructions for communicating last use information to the hardware are evaluated:

1. Free Register Bit: an instruction that also communicates last use information to the hardware via dedicated instruction bits, with the dual benefits of immediately identifying last uses and requiring no additional instruction overhead. This instruction serves as an upper bound on performance improvements that can be attained with the compiler's static last use information. To simulate Free Register bit, the Multiflow compiler was modified to generate a table, indexed by the PC, that contains flags indicating whether either of an instruction's register operands were last uses. For each simulated instruction, the simulator performed a lookup in this table to determine whether renaming register deallocation should occur when the instruction is retired.

2. Free Register: a separate instruction that specifies one or more renaming registers to be freed. The compiler can specify the Free Register instruction immediately after any instruction containing a last register use (if the register is not also redefined by the same instruction). This instruction frees renaming registers as soon as possible, but with an additional cost in dynamic instruction overhead.

3. Free Mask: an instruction that can free multiple renaming registers over larger instruction sequences. The dead registers are identified at the end of each scheduling block (with the Multiflow™ compiler, this is a series of basic blocks called a trace). Rather than using a single instruction to free each dead register, a bit mask is generated that specifies them all. In one embodiment, the Free Mask instruction may use the lower 32-bits of an instruction register as a mask to indicate the renaming registers that can be deallocated. The mask is generated and loaded into the register using a pair of Ida and Idah instructions, each of which has a 16-bit immediate field. The examples shown in FIGS. 11B–11C compare Free Register with Free Mask relative to the base, for a code fragment that frees integer registers 12, 20, 21, 22, 23, and 29. FIG. 11C shows the Free Mask instruction (fm1) necessary to free the same registers. The Free Mask instruction sacrifices the promptness of Free Register's deallocation for a reduction in instruction overhead.

4. Free Opcode: an instruction that is motivated by the observation that ten opcodes are responsible for 70% of the dynamic instructions with last use bits set, indicating that most of the benefit of Free Register Bit could be obtained by providing special versions of those opcodes. In addition to expecting their normal operation, the new instructions also specify that either the first, second, or both operands are last uses. FIGS. 23A and 23B list 15 opcodes (instructions) that could be retrofitted into an existing ISA, e.g., all of these opcodes could be added to the Digital Equipment Corporation Alpha™ instruction set architecture (ISA), without negatively impacting instruction decoding.

5. Free Opcode/Mask: an instruction that augments the Free Opcode instruction by generating a Free Mask instruction at the end of each trace. This hybrid scheme addresses register last uses for instructions that are not covered by the particular choice of instructions for Free Opcode.

For all five techniques, the underlying hardware support is very similar. In current register renaming schemes, physical registers are deallocated during the commit phase of the pipeline; similarly, when one of these instructions (Free Register, Free Mask, Free Opcode, Free Opcode/Mask or instruction with Free Register Bits set) commits, the dead renaming registers are deallocated and added back to the free register list, and the corresponding architecturally specified register-to-renaming register mappings are invalidated, if necessary.

Currently, renaming hardware provides mechanisms for register deallocation (i.e., returning renaming registers to the free register list when the architectural register is redefined) and can perform many deallocations each cycle. For example, the Alpha 21264™ may deallocate up to 13 renaming registers each cycle to handle multiple instruction retirement. Free Mask is more complex because it may specify even more than 13 registers, e.g., 32 registers. In this case, the hardware can take multiple cycles to complete the deallocation. However, it has been shown that only 7.2 registers, on average, were freed by each mask.

TABLE 4

Dead register distance for eight threads.

| Benchmark | Dead Register Distance | | | | | | | |
|---|---|---|---|---|---|---|---|---|
| | FSR8 | | FSR16 | | FSR32 | | FSR96 | |
| | avg. cycles | avg. instr. | avg. cycles | avg. instr. | avg. cycles | avg. instr. | avg. cycles | avg. instr. |
| Cho | 47.4 | 14.7 | 41.4 | 14.7 | 36.0 | 14.6 | 32.3 | 14.5 |
| Hydro2d | 93.6 | 39.4 | 86.7 | 39.5 | 79.9 | 39.6 | 74.6 | 39.5 |
| Mgrid | 21.8 | 11.7 | 21.5 | 11.7 | 21.4 | 11.7 | 21.4 | 11.7 |
| Mxm | 60.6 | 14.6 | 45.3 | 14.7 | 36.9 | 15.0 | 35.2 | 15.9 |
| Swim | 84.8 | 30.1 | 81.7 | 30.4 | 92.6 | 31.0 | 83.4 | 31.2 |
| Tomcatv | 100.8 | 20.0 | 79.2 | 19.9 | 61.1 | 20.0 | 47.1 | 19.9 |
| Vpc | 196.2 | 26.2 | 195.5 | 26.7 | 195.0 | 27.7 | 219.6 | 30.2 |

Free Register Results

Since FSR is the most efficient of the four register file schemes disclosed above, it is used as a baseline for evaluating the benefits of the register free mechanisms. The examination begins with the smallest FSR configuration (FSR8), since it suffered the most fetch stalls. Table 5 indicates that Free Register reduces the number of fetch stalls caused by insufficient registers by an average of 8% (INT) and 4% (FP). However, the reductions come at the price of an increase in dynamic instruction count, reaching nearly 50% for some applications. The net result is that for most programs, Free Register actually degrades performance, as shown in the comparisons of FIGS. 12A–12G, where the two leftmost bars for each benchmark compare total execution cycles for FSR8 with and without Free Register. These results indicate that, while there may be some potential for program speedups with better renaming register management, Free Register's overhead negates any possible gains.

Free Mask Results

The Free Mask scheme attempts to lower Free Register's instruction overhead by reducing the number of renaming register deallocation instructions.

As shown in Table 5, the Free Mask scheme requires a more modest increase in instruction count, while still reducing the number of fetch stalls. Notice that there is one anomalous result with "swim," where integer register fetch stalls decrease, but FP register fetch stalls increase, both substantially. With a small register file, "swim" has insufficient integer registers to load all array addresses and therefore frequently stalls. With a larger set of renaming registers (or more efficient use of registers with Free Mask), this bottleneck is removed, only to expose the program's true bottleneck—a large FP register requirement.

Register. Free Register Bit uses two dedicated instruction bits for encoding last use information directly into the instructions. Consequently, it avoids the instruction cost of Free Register, without sacrificing fine-granularity renaming register deallocation, as shown by the smaller average dead register distances in Table 6. For example, on average, Free Register Bit reduces the dead register distance by 420% (cycles) and 413% (instructions), with no additional instruction overhead relative to FSR8. Its improved renaming register management outperforms the other three techniques, achieving average speedups of 92%, 103%, and 64% versus FSR8, Free Register and Free Mask, respectively (FIGS. 12A–12G, rightmost bar).

When comparing Free Register Bit to all four FSR sizes, two performance characteristics are apparent (see the graphs in FIGS. 13A–13G). First, Free Register Bit is most advantageous for smaller sets of renaming registers (for example, it obtains a 64% speedup over FSR8), since registers are a non-limited resource in these cases. Larger sets of registers see less benefit, because, for many applications, there are already sufficient registers and further speedups are limited by other processor resources, such as the size of the instruction queues. Second, Free Register Bit allows smaller sets of

TABLE 5

Program execution characteristics (FSR8, 8 threads)

| | Base | | | Free Register | | | Free Mark | | |
|---|---|---|---|---|---|---|---|---|---|
| Benchmark | useful insts executed (millions) | fetch stalls because no free int regs | fetch stalls because no free FP regs | useful insts executed (millions) | fetch stalls because no free int regs | fetch stalls because no free FP regs | useful insts executed (millions) | fetch stalls because no free int regs | fetch stalls because no free FP regs |
| Cho | 62.3 | 69.2% | 0.0% | 81.4 | 54.9% | 0.0% | 67.9 | 57.8% | 0.0% |
| Hydro2d | 666.5 | 15.1% | 41.2% | 879.2 | 12.9% | 27.4% | | | |
| Mgrid | 423.1 | 5.1% | 0.2% | 597.5 | 2.4% | 0.0% | | | |
| Maximum | 72.1 | 64.0% | 0.3% | 111.2 | 50.9% | 0.1% | 76.4 | 46.7% | 0.1% |
| Swim | 431.4 | 52.7% | 8.2% | 626.1 | 36.4% | 3.9% | 464.9 | 3.2% | 26.0% |
| Tomcatv | 437.3 | 3.1% | 90.5% | 632.4 | 3.5% | 83.5% | | | |
| Vpe | 22.5 | 78.8% | 2.6% | 32.1 | 69.5% | 1.2% | 23.3 | 0.5% | 1.9% |

In terms of total execution cycles, Free Mask outperforms Free Register and FSR8 base. For some applications, Free Mask is not as effective as Free Register in reducing fetch stalls, but, because of its lower overhead, it reduces total execution cycles.

registers to attain performance comparable to much larger sets of registers, because it uses registers much more effectively. FIGS. 13A–13G illustrate that for several applications, Free Register Bit FSR8 outperforms FSR32 by 17%; when compared to FSR96, Free Register Bit FSR8

TABLE 6

Average dead register distances and percentage increase in instructions executed relative to FSR8.

| FSR8 | | Free Register FSR8 | | | Free Mask FSR8 | | | Free Register Bit FSR8 | | | FSR96 | | |
|---|---|---|---|---|---|---|---|---|---|---|---|---|---|
| Dead register distance | | Dead register distance | | Instrs executed | Dead register distance | | Instrs executed | Dead register distance | | Instrs executed | Dead register distance | | Instrs executed |
| Avg. cycles | avg. instrs | avg. cycles | avg. instrs | (% increase vs. FSR8) | avg. cycles | avg. instrs | (% increase vs. FSR8) | avg. cycles | avg. instrs | (% increase vs FSR8) | avg. cycles | avg. instrs | (% increase vs. FSR8) |
| 86.5 | 224 | 90.6 | 31.0 | 42% | 35.7 | 6.4 | 7% | 20.6 | 4.7 | 0% | 73.4 | 20.6 | 0% |

Encoding Last Use Information in the ISA

Although Free Mask was able to improve performance for several applications, its more infrequent use over a larger program space somewhat limits its ability to deallocate renaming registers expediently. Free Register Bit addresses this drawback, as well as the instruction overhead of Free only lags by 2.5%. FSR96 attains better performance, simply because it has more registers; FSR96's waste distance is still very large, averaging 73.4 execution cycles and 20.6 instructions.

Figure 15:
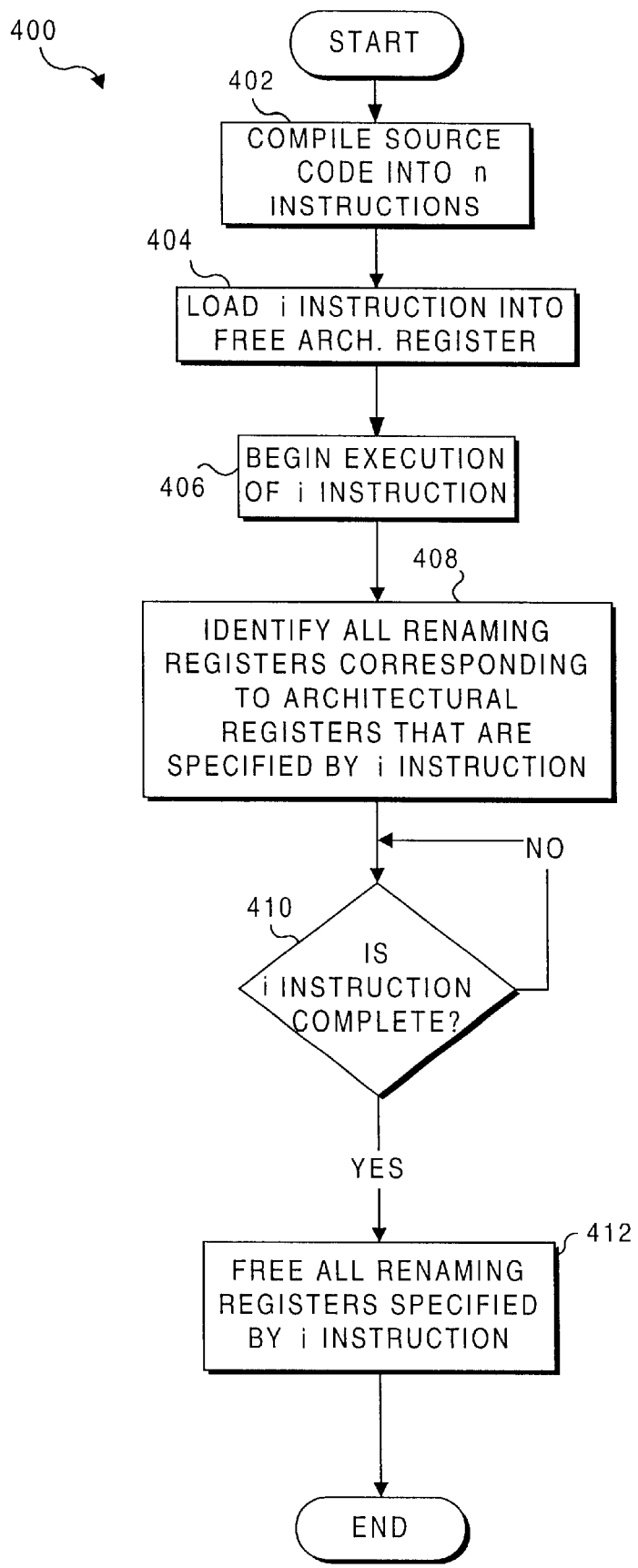
FIG. 15 is a block diagram that graphically depicts determining the renaming registers to be freed upon completion of an associated instruction.

The primary drawback for this approach is that it requires dedicated instruction bits, as is also the case with other architectural mechanisms such as software-set branch prediction bits. Using additional instruction bits for last uses may shave valuable bits off the immediate or branch offset fields. If the opcode bits prove difficult to retrofit into existing ISAs, the large potential for performance gains with more careful renaming register deallocation justifies further investigation into alternative or more intelligent Free Register and Free Mask implementations. In FIG. 15, a block diagram illustrates an overview 400 of the logic implemented for the present invention. Moving from a start block, the logic steps to a block 402, and a compiler converts source code into a plurality (n) instructions that are recognizable by a processor. The logic advances to a block 404, where the processor fetches the next or i instruction (i ranges from 1 to n) from the instruction cache. In a block 406, the processor decodes the i instruction. Next, the logic steps to a block 408, where the processor employs the i instruction to identify all renaming registers that correspond to the architectural registers specified by the i instruction. Stepping to a decision block 410, a determination is made as to whether the i instruction has been completed. The logic continuously loops until the test is true, and then advances to a block 412. In this block, the processor frees all of the renaming registers specified by the i instruction. Lastly, the logic steps to an end block and the flow of logic for the i instruction is complete. Thus, the present invention enables the processor to free renaming registers specified by the i instruction, once the instruction is completed. In contrast, the prior art provides for freeing the renaming registers only when the architectural register is redefined by the loading of another instruction.

Figure 16A:
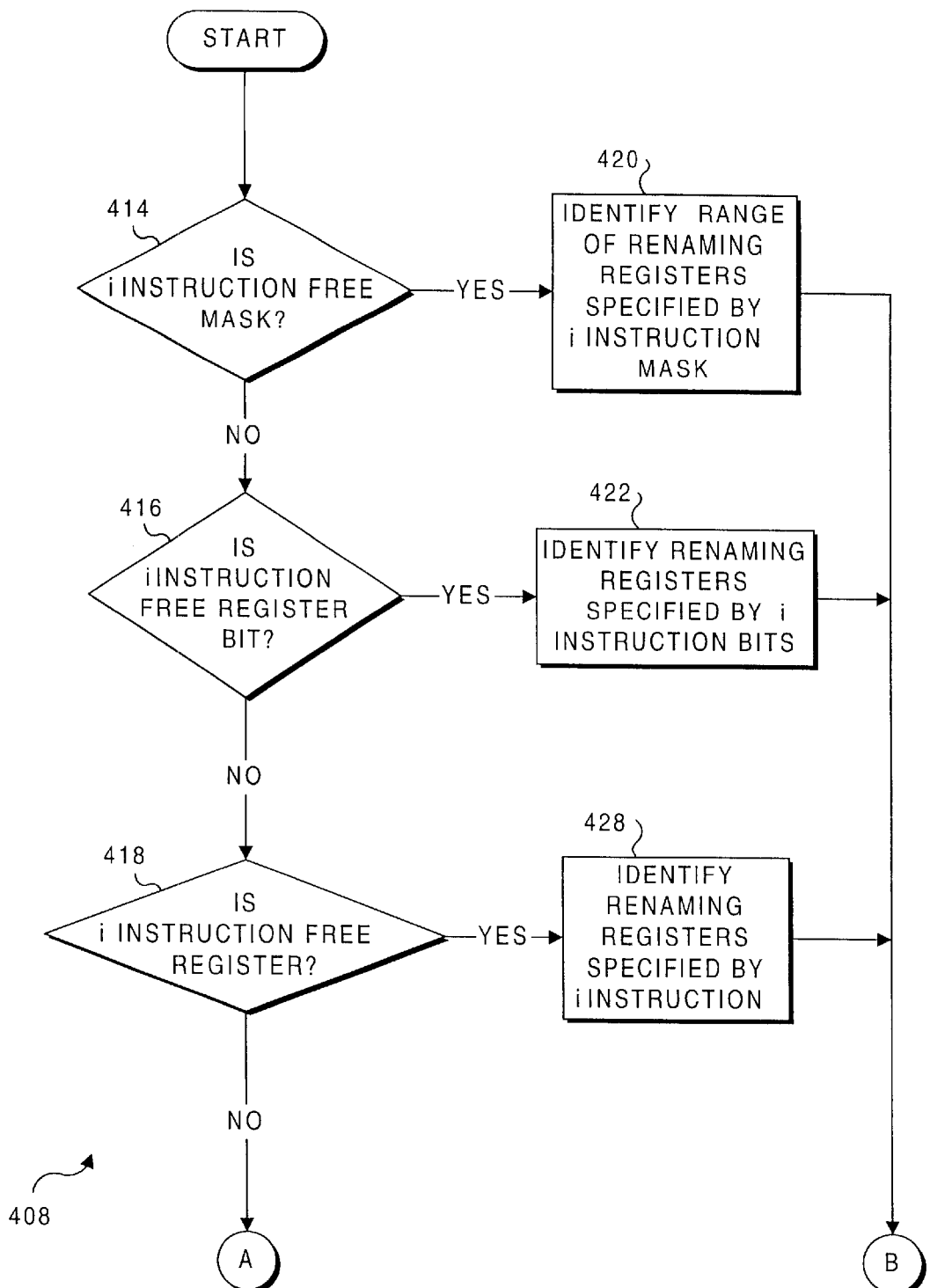
FIG. 16A is a block diagram that graphically illustrates identifying specific renaming registers that are to be freed upon completion of an associated instruction.

Referring to FIG. 16A, a flow chart provides greater detail for the logic employed in block 408. Moving from a start block to a decision block 414, a determination is made whether the i instruction is a Free Mask instruction. If true, a block 420 employs the hardware (processor) to identify the range of renaming registers specified by the mask in the Free Mask instruction. Next, the logic continues at decision block 410 (FIG. 15).

If the determination at decision block 414 is negative, a decision block 416 determines whether the i instruction is a Free Register Bit instruction. If so, the logic advances to a block 422, in which the processor identifies the renaming registers specified by particular bits in the i instruction. After identification, the logic again proceeds with decision block 410.

If the determination at decision block 416 is negative, a decision block 418 determines whether the i instruction is a Free Register instruction. If true, a block 428 indicates that (the processor) identifies the renaming registers specified by the i instruction. Next, the logic again returns to decision block 410 in FIG. 15.

Figure 16B:
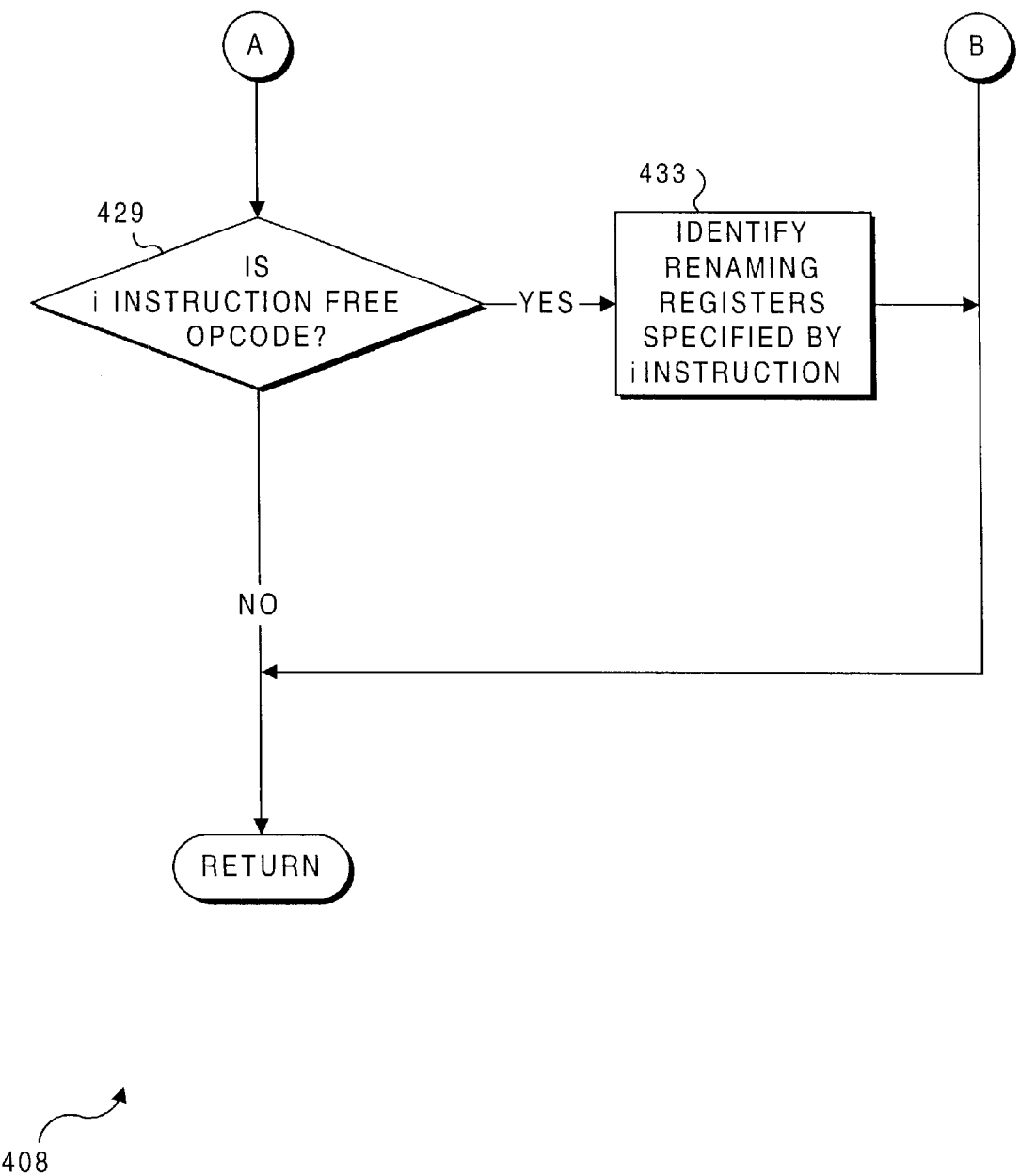
FIG. 16B is another block diagram that graphically depicts identifying specific renaming registers that are to be freed upon completion of the associated instruction.

Turning to FIG. 16B, if the determination at decision block 418 is negative, a decision block 429 determines whether the i instruction is the Free Opcode instruction. If true, a block 433 provides for (the processor) identifying the renaming registers specified by the i instruction. Thereafter, the logic again returns to decision block 410. Also, if the determination at decision block 429 is negative, the logic continues to decision block 410.

Figure 17:
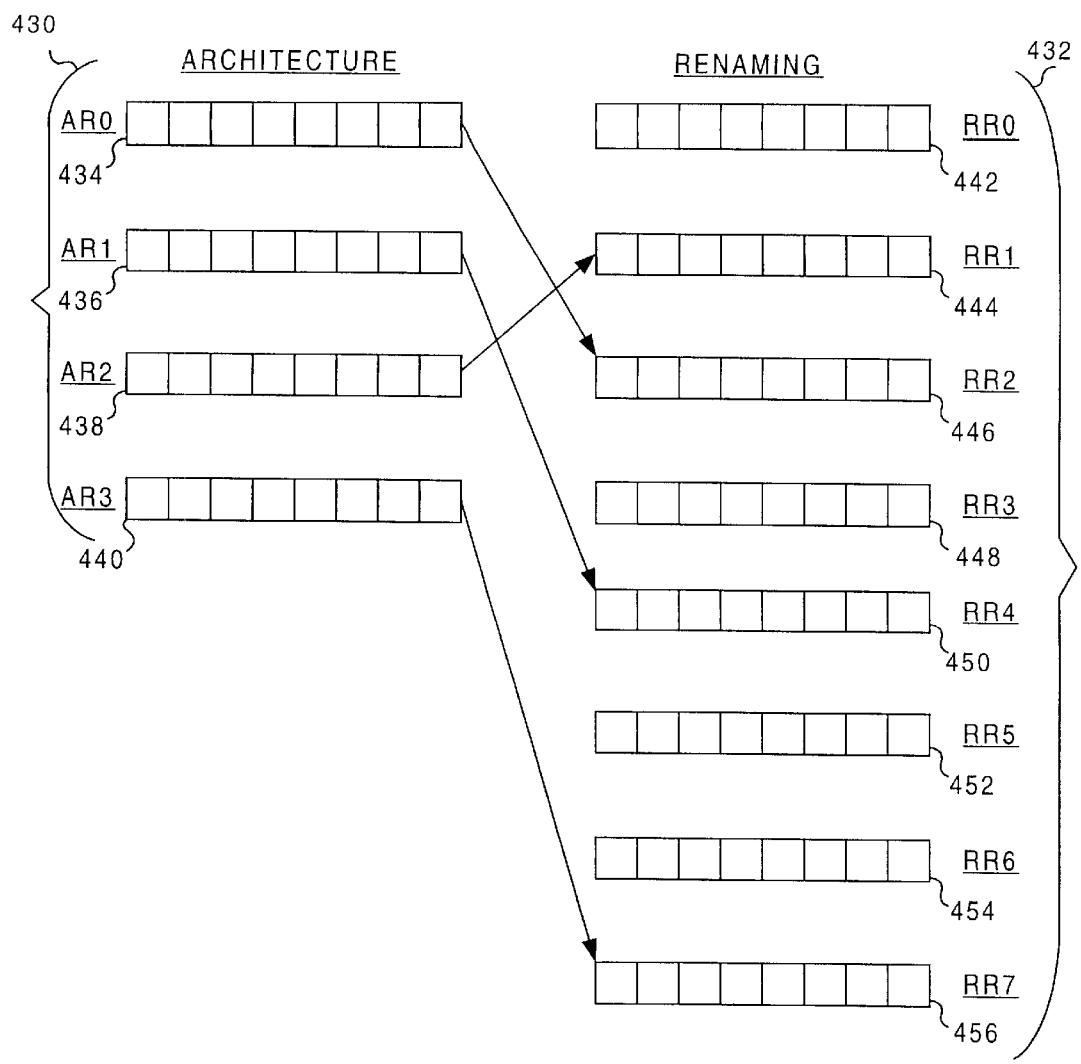
FIG. 17 is an overview of a data structure that shows the association of architectural registers with renaming registers.

It may be helpful to consider how references to architecturally specified registers in instructions are mapped to renaming registers. In FIG. 17, an architecturally specified register set 430 is illustrated that includes four architectural registers (AR0–AR3); also shown is a renaming register set 432 that contains eight renaming registers (RR0–RR7). RR2 register 446 is allocated to AR0 register 434 and RR4 register 450 is allocated to AR1 register 436. Also, RR1 register 444 is allocated to AR2 register 438 and RR7 register is allocated to AR3 register 440. Typically, the number of renaming registers will be greater than the number of architectural registers for most processors that execute instructions out-of-order.

Figure 18:
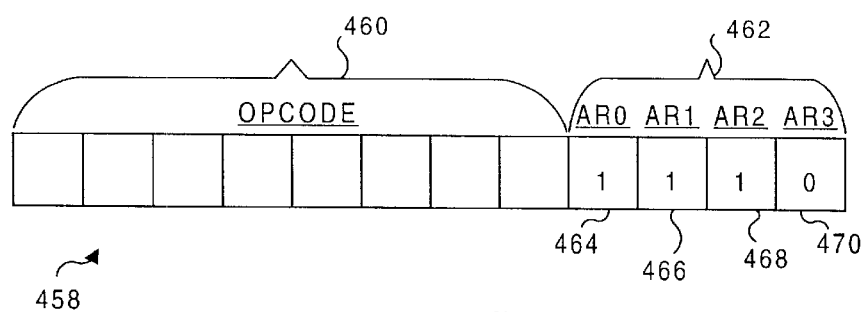
FIG. 18 is a binary representation that illustrates a free mask instruction which includes a mask that may identify a range of renaming registers to be freed upon completion of the instruction.

Turning to FIG. 18, a binary representation 458 for the Free Mask instruction is illustrated that includes an opcode 460 and a mask 462. Mask 462 includes a separate bit that is mapped to each architectural register. Opcode 460 signals the processor to employ mask 462 to free renaming registers. When a bit in mask 462 is set to one, the processor will free the renaming register allocated to the specified architectural register. Conversely, if a bit in the mask is set to zero, the processor will not free the renaming register allocated to the specified architectural register. AR0 register 434 is mapped to bit 464 and AR1 register 436 is mapped to bit 466. Further, AR2 register 438 is mapped to bit 468 and AR3 register 440 is mapped to bit 470. In this example, the processor will free the three renaming registers allocated to AR0 register 434, AR1 register 436, and AR2 register 438.

Figure 19:
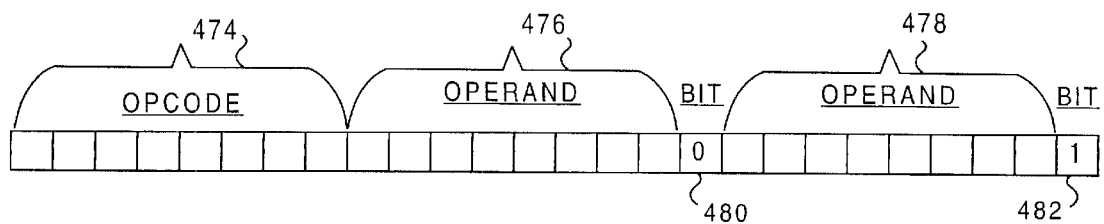
FIG. 19 depicts another binary representation for a free register bit instruction which includes instruction bits that identify the renaming registers that are to be freed upon completion of the instruction.

In FIG. 19, a binary representation 472 for the Free Register Bit instruction is illustrated. Data structure 472 includes an opcode 474, an operand 476 corresponding to bit 480, and an operand 478 corresponding to bit 482. Similar to the Free Mask instruction, when a bit in the Free Mask instruction is set to one, the processor will free the renaming register allocated to the architectural register specified by the operand that corresponds to the bit. Conversely, if a bit in the instruction is set to zero, the processor will not free the renaming register allocated to the architectural register specified with the operand that corresponds to the bit. In this example, the processor will free the renaming register allocated to the architectural register associated with operand 478. It is important to note that the Free Register Bit instruction is not only employed to free renaming registers. In addition, opcode 474, operand 476, and operand 478 may be employed to cause the processor to perform various instructions, such as add and subtract. Significantly, the extra bits eliminate the need to process another instruction that separately indicates the renaming registers to be freed.

Figure 20:
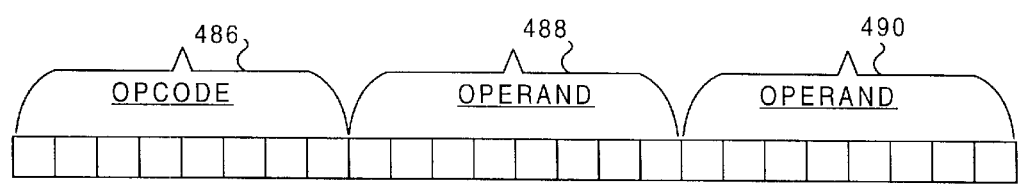
FIG. 20 shows another binary representation for a free register instruction which identifies the renaming registers that are to be freed upon completion of the instruction.

FIG. 20 shows a binary representation 484 for a Free Register instruction. Data structure 484 includes an opcode 486, an operand 488 and another operand 490. When the processor receives the Free Register instruction, it will free the renaming registers allocated to the architectural registers associated with the operands. Unlike the Free Register Bit instruction, opcode 486, operand 488, and another operand 490 are not also used to perform another type of operation or function. Instead, the Free Register instruction is a separate instruction employed only for specifying particular renaming register(s) to be freed.

Figure 21:
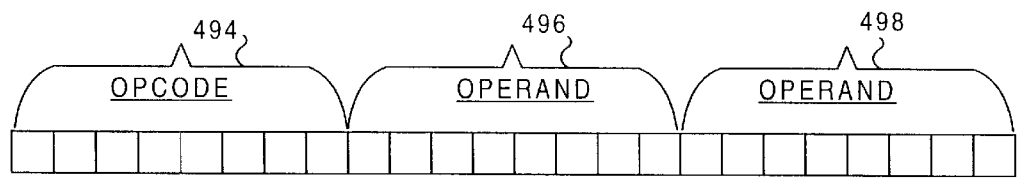
FIG. 21 illustrates another binary representation for a free opcode instruction which includes the identification of the renaming registers that are to be freed upon completion of the instruction.

FIG. 21 illustrates a binary representation 492 for a Free Opcode instruction. Data structure 492 includes an opcode 494, an operand 496 and another operand 498. It is envisioned that the Free Opcode instruction will not only be employed to free renaming registers, but in addition, opcode 494, operand 494, and operand 496 may be employed by the processor to perform various other functions, such as add and subtract. Also, upon completion of the instruction the processor will free the renaming registers allocated to the architectural registers associated with the operands.

In FIG. 22A, a table 500 of exemplary integer Free Opcode instructions is illustrated. An opcode column 502, a $1^{st}$ operand column 504 and a $2^{nd}$ operand column 506 are included to identify each instruction. A mark in one of the operand columns indicates that the renaming register allocated to the architectural register associated with the operand and will be freed upon completion of the instruction. The integer instructions include an addl 508, an subl 510, a mull 512, an stl 514, a beq 516, an lda 518, and an ldl 520. Similarly, FIG. 22B depicts a table 522 of floating point Free Opcode instructions. An opcode column 524, a $1^{st}$ operand column 526 and a $2^{nd}$ operand column 528 are provided to identify each instruction. A mark in an operand columns indicates that the renaming register allocated to the architectural register associated with the operand will be freed upon completion of the instruction. The floating point instructions include an addt 530, an subt 532, a mult 534, a mult 536, an stt 538, an stt 540, a fcmov 542, and a fcmov 544.

Figure 23:
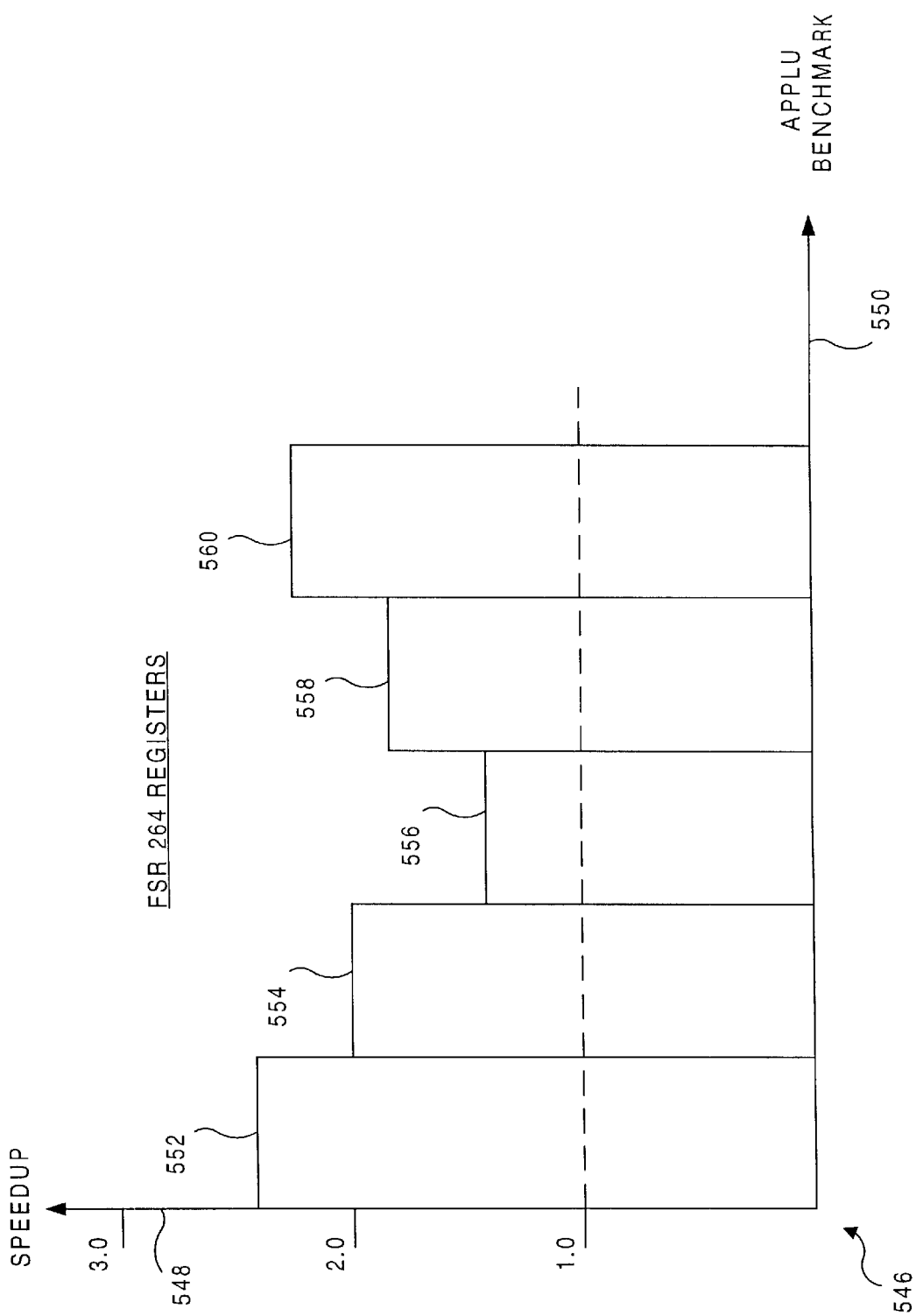
FIG. 23 is a histogram that depicts the speedup provided by five embodiments of the present invention for a 264 register FSR.

In FIG. 23, a histogram 546 illustrates the speedup for a 264 register FSR that is provided by the five instructions discussed above, i.e., a Free Register Bit 552, a Free Register 554, a Free Register Mask 556, a Free Register Opcode 558, and a Free Register Opcode/Mask 560, when an "applu" benchmark was used to simulate the use of the five instructions. A y-axis 548 indicates the magnitude of the speedup for an out-of-order processor, for each of the five types of instructions, arrayed along an x-axis 550. In this case, Free Register Bit 552 provides the largest speedup, and Free Mask 556 provides the least increase for an out-of-order processor.

Figure 24:
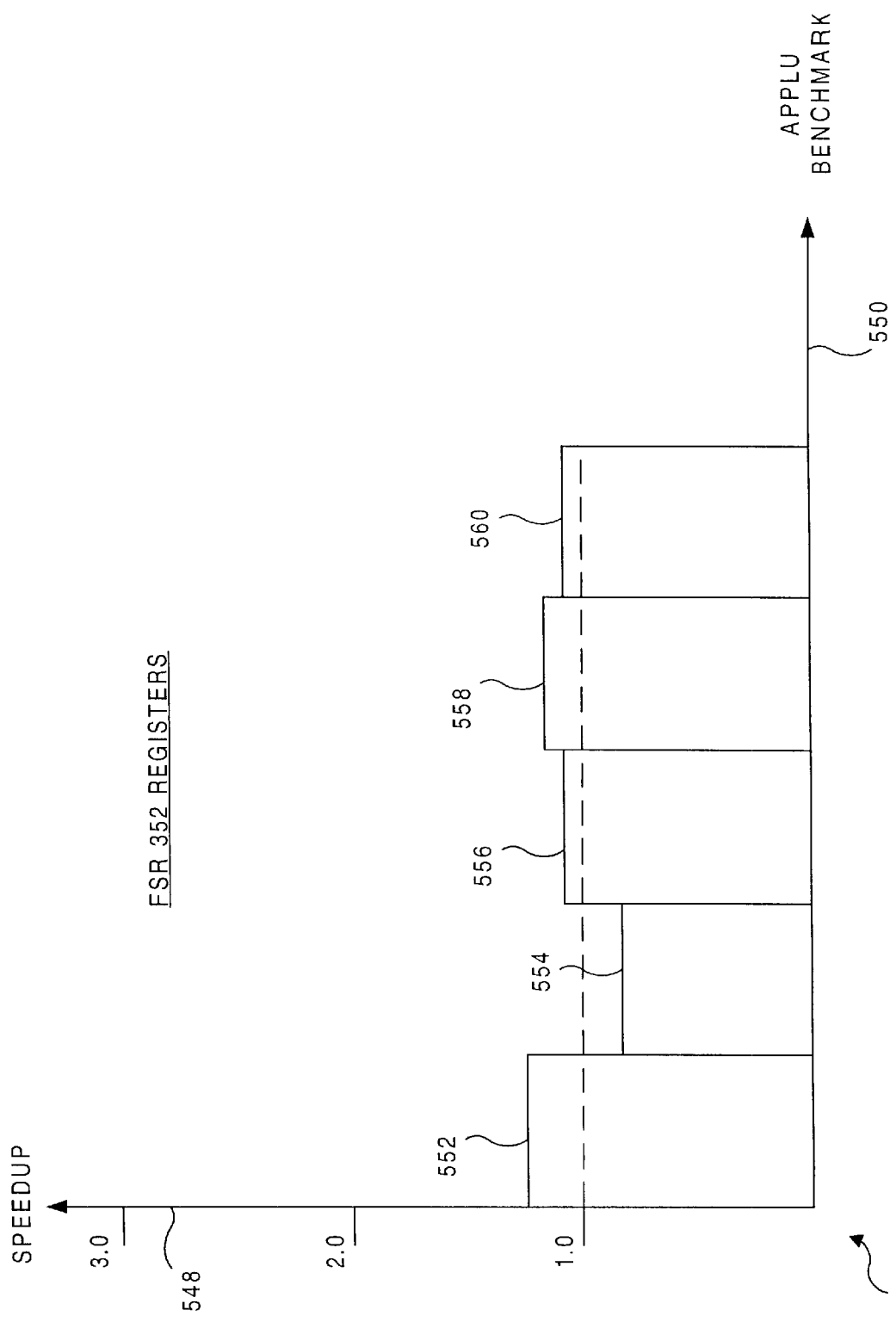
FIG. 24 is another histogram that illustrates the speedup provided by five embodiments of the present invention for a 352 register FSR.

As shown in FIG. 24, a histogram 562 shows the speedup for a 352 register FSR that is provided by the five instructions discussed above, i.e., Free Register Bit 552, Free Register 554, Free Register Mask 556, Free Register Opcode 558, and Free Register Opcode/Mask 560, when the "applu" benchmark was used to simulate the use of the five instructions. In this case, Free Register Bit 552 continues to provide the largest speedup and Free Register 554 provides the least increase for an out-of-order processor.

As illustrated in FIGS. 23 and 24, the Free Opcode instruction and its variant, Free Opcode/Mask, strike a balance between Free Register and Free Mask by promptly deallocating renaming registers, while avoiding instruction overhead. When registers are at a premium, the Free Opcode/Mask instruction achieves or exceeds the performance of the Free Register instruction. Also, when more registers are available or for applications with low register usage, the Free Opcode instruction attains or exceeds the performance of the Free Mask instruction. It has been found that for most register set sizes, the Free Opcode and Free Opcode/Mask instructions meet or approach the optimal performance of the Free Register Bit instruction. Although not shown, a cache employed with an FSR substantially supports this finding.

Applicability to Other Architectures

Although the benefits of the renaming register freeing mechanisms have been examined in the context of an SMT processor, the techniques are applicable to any other architecture that employs out-of-order execution of instructions as well. Providing explicit information about the life times of renaming registers, benefits the performance of any out-of-order processor that uses explicit register renaming. As discussed above, the SMT processor and register set models can be used as an indication of how much single-threaded, dynamically-scheduled processors could also benefit from the present invention. FIGS. 14A–14G show the performance gain for Free Register Bit with various PAPR file sizes when only a single thread is running. For example, PAPR32 with one thread is equivalent to a wide-issue superscalar with 64 physical registers (32 private architectural+32 renaming). As with the eight thread FSR results, Free Register Bit has greatest benefit for smaller sets of register. In contrast to the FSR results, however, Free Register Bit continues to provide performance gains for larger sets of registers. Also, with only one thread supplying parallelism, more registers appear to be required for exposing parallelism in the instructions executed by the processor.

In the preferred embodiment, the compiler provides instructions that indicate the last use of a renaming register. In this case, the processor does not have to wait for a redefinition of the corresponding architectural register before the renaming register may be reused for another instruction. In another embodiment, the user could introduce an explicit instruction in the source code that provides for de-allocating renaming registers. Also, it is envisioned that another embodiment could use the operating system to provide for de-allocating renaming registers. When a context becomes idle, the operating system would detect the idleness and indicate to the processor that the idle context's renaming registers can be de-allocated. In a multithreaded processor, the operating system could execute an instruction that indicates when a thread is idle. For example, there could be a processor register with i bits (one bit for each of i threads), and the operating system would set or clear bit j to indicate that the j thread is active or idle. In this way, the renaming registers are freed for the execution of other instructions.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for freeing a renaming register, the renaming register being allocated to an architectural register by a processor for the out-of-order execution of at least one of a plurality of instructions, comprising the steps of:
   (a) before a last use of the architectural register occurs, determining the last use of the architectural register, to determine when the renaming register can be released;
   (b) based upon results from the step of determining, including an indicator with the plurality of instructions, the indicator indicating that the renaming register is to be freed from allocation to the architectural register following execution of an instruction corresponding to the last use of the renaming register by the architectural register; and
   (c) employing the indicator to identify the renaming register and the instruction corresponding to the last use of the renaming register by the architectural register to the processor, the processor freeing the identified renaming register from allocation to the architectural register in response to the indicator, following execution of the instruction corresponding to the last use of the renaming register by the architectural register, so that the renaming register is available to the processor for reallocation.

2. The method of claim 1, wherein the indicator is a bit included with one of said plurality of instructions, said one of the plurality of instructions defining the architectural register and the bit indicating that the renaming register allocated to the architectural register is to be freed when the instruction is completed by the processor.

3. The method of claim 1, wherein the indicator is another instruction that indicates that the renaming register allocated to a particular architectural register is to be freed by the processor.

4. The method of claim 1, wherein the indicator is a mask that includes a plurality of bits, each bit corresponding to one of a plurality of architectural registers and being employed to indicate that the renaming register allocated to the architectural register is to be freed by the processor.

5. The method of claim 4, wherein the mask is included with another instruction, the other instruction being employed to indicate that at least one of the plurality of renaming registers allocated to the plurality of architectural registers is to be freed by the processor.

6. The method of claim 4, wherein the mask is included with the instruction, the mask being employed to indicate that at least one of the plurality of renaming registers allocated to the plurality of architectural registers is to be freed when the instruction is completed by the processor.

7. The method of claim 1, wherein the indicator is an opcode that is included with the instruction, the instruction defining the architectural register and the opcode being employed to indicate that the renaming register allocated to the architectural register is to be freed by the processor when the execution of the instruction is completed.

8. The method of claim 1, further comprising the step of employing a compiler to provide the indicator, the compiler determining when to employ the indicator to indicate that the renaming register allocated to the architectural register is to be freed by the processor.

9. The method of claim 1, further comprising the step of enabling a user to provide the indicator to the processor, the user determining when to employ the indicator to indicate when the renaming register allocated to the architectural register is to be freed by the processor.

10. The method of claim 1, further comprising the step of employing the freed renaming register for the execution of said another instruction, the processor reallocating the freed renaming register to the architectural register defined by said another instruction.

11. The method of claim 1, wherein the processor is multithreaded, the multithreaded processor being enabled to execute out-of-order a plurality of instructions that are associated with a plurality of threads.

12. The method of claim 11, further comprising the steps of:
   (a) employing an operating system to determine if the execution of a thread is complete; and if true
   (b) employing the operating system to produce an instruction, the instruction indicating that the execution of the thread is complete and indicating that the renaming registers allocated to the architectural registers associated with the thread are to be freed by the multithreaded processor.

13. The method of claim 11, wherein the multithreaded processor employs a plurality of shared registers, the shared registers being definable as either the architectural register or the renaming register as required for the execution of each thread.

14. A storage medium comprising a plurality of processor-executable instructions, said plurality of instructions being executable on a processor that supports out-of-order execution of at least one of said plurality of instructions by allocating a renaming register to an architectural register on said processor, an indicator being included with said plurality of instructions for indicating that the renaming register is to be freed from allocation to the architectural register following execution of an instruction corresponding to the last use of the renaming register by the architectural register, execution of said plurality of instructions causing the processor to perform the functions of:

(a) before a last use of the architectural register occurs, determining a last use of the architectural register to determine when the renaming register can be released;
(b) based upon results from the steP of determining, employing the indicator to identify the renaming register and the instruction corresponding to the last use of the renaming register by the architectural register to the processor; and
(c) freeing the identified renaming register from allocation to the architectural register in response to the indicator, following execution of the instruction corresponding to the last use of the renaming register by the architectural register, so that the renaming register is available to the processor for reallocation.

15. A method for freeing a renaming register, the renaming register being allocated to an architectural register by a processor for the out-of-order execution of at least one of a plurality of instructions, comprising the steps of:
   (a) employing a compiler to provide an indicator, the indicator indicating that the renaming register is to be freed from allocation to the architectural register, the compiler performing a plurality of functional steps, comprising:
      (i) determining when a value in an architectural register will no longer be needed; and
      (ii) employing the determination to produce the indicator; and
   (b) including the indicator with the plurality of instructions; and
   (c) employing the indicator to identify the renaming register to the processor, the processor freeing the identified renaming register from allocation to the architectural register, so that the renaming register is available to the processor for the execution of another instruction.

16. A system for freeing a renaming register, the renaming register being allocated to an architectural register for the out-of-order execution of at least one of a plurality of instructions, comprising:
   (a) a processor, the processor being coupled to the architectural register and the renaming register; and
   (b) a memory being coupled to the processor, the memory storing a plurality of logical steps that are implemented by the processor, comprising:
      (i) before a last use of the architectural register occurs, determining the last use of the architectural register, to determine when the renaming register can be released for reallocation;
      (ii) based upon results from the step of determining, including an indicator with the plurality of instructions, the indicator indicating that the renaming register is to be freed from allocation to the architectural register following execution of an instruction corresponding to the last use of the renaming register by the architectural register; and
      (iii) employing the indicator to identify the renaming register and the instruction corresponding to the last use of the renaming register by the architectural register to the processor, the processor freeing the identified renaming register from allocation to the architectural register in response to the indicator, following execution of the instruction corresponding to the last use of the renaming register by the architectural register, so that the renaming register is available to the processor for reallocation.

* * * * *

UNITED STATES PATENT AND TRADEMARK OFFICE
CERTIFICATE OF CORRECTION

PATENT NO. : 6,314,511 B1
DATED : November 6, 2001
INVENTOR(S) : Levy et al.

It is certified that error appears in the above-identified patent and that said Letters Patent is hereby corrected as shown below:

Column 1,
Line 6, after the title, please insert the following section heading and paragraph:
-- Government Rights
This invention was made with government support under NSF Grant Number MIP-9632977 issued by the National Science Foundation. The government has certain rights in the invention. --
Line 64, "Weihi" should read -- Weihl --

Column 4,
Line 44, "Conventional" should read -- conventional --
Line 45, "The" should read -- the --

Column 5,
Line 50, "ie.," should read -- i.e., --
Line 53, "threaders" should read -- threads --

Column 6,
Line 5, "config on" should read -- configuration --
Line 11, after "register" insert -- bit --
Line 12, "threaders" should read -- threads --
Line 15, "fre" should read -- free --
Line 35, "fire" should read -- free --

Column 8,
Line 12, "R1000$^{TM}$" should read -- R10000$^{TM}$ --

Column 11,
Line 44, "Renamning" should read -- Renaming --

Column 23,
Line 67, "ARO" should read -- AR0 -- (zero)

UNITED STATES PATENT AND TRADEMARK OFFICE
CERTIFICATE OF CORRECTION

PATENT NO. : 6,314,511 B1
DATED : November 6, 2001
INVENTOR(S) : Levy et al.

It is certified that error appears in the above-identified patent and that said Letters Patent is hereby corrected as shown below:

Column 28,
Line 4, "steP" should read -- step --

Signed and Sealed this

Seventh Day of May, 2002

*Attest:*

*Attesting Officer*

JAMES E. ROGAN
*Director of the United States Patent and Trademark Office*